United States Patent
Hwang et al.

(10) Patent No.: US 10,601,573 B2
(45) Date of Patent: Mar. 24, 2020

(54) ASYNCHRONOUS DIGITAL COMMUNICATION MODULE

(71) Applicant: GMK CO. LTD., Seoul (KR)

(72) Inventors: Jin Soon Hwang, Seoul (KR); Jeong Woo Lee, Seoul (KR)

(73) Assignee: GMK CO., LTD., Seoul (KR)

( * ) Notice: Subject to any disclaimer, the term of this patent is extended or adjusted under 35 U.S.C. 154(b) by 0 days.

(21) Appl. No.: 16/521,257

(22) Filed: Jul. 24, 2019

(65) Prior Publication Data

US 2019/0386811 A1 Dec. 19, 2019

Related U.S. Application Data

(63) Continuation of application No. 16/251,720, filed on Jan. 18, 2019, now Pat. No. 10,411,874, which is a continuation of application No. PCT/KR2017/007732, filed on Jul. 18, 2017.

(30) Foreign Application Priority Data

Jul. 19, 2016 (KR) .................. 10-2016-0091124

(51) Int. Cl.
  *H04L 25/34* (2006.01)
  *H04L 7/00* (2006.01)
  *H04L 5/16* (2006.01)

(52) U.S. Cl.
  CPC .............. *H04L 7/0087* (2013.01); *H04L 5/16* (2013.01); *H04L 7/0091* (2013.01)

(58) Field of Classification Search
  CPC ........ H04L 7/0087; H04L 5/16; H04L 7/0091
  USPC .......................... 375/286, 288, 289, 293, 359
  See application file for complete search history.

(56) References Cited

U.S. PATENT DOCUMENTS

| 4,216,426 A * | 8/1980 | Flora .................... H04L 25/4925 375/257 |
| 5,600,634 A | 2/1997 | Satoh et al. |
| 6,937,664 B1 * | 8/2005 | Park ........................ H04L 25/49 375/259 |

(Continued)

FOREIGN PATENT DOCUMENTS

| JP | H11-187005 A | 7/1999 |
| KR | 10-1998-0076203 A | 11/1998 |

(Continued)

OTHER PUBLICATIONS

Korean Intellectual Property Office, Notice of Allowance for Korean Application No. 10-2016-0091124; dated Feb. 26, 2018; 2 pages.

(Continued)

*Primary Examiner* — Don N Vo
(74) *Attorney, Agent, or Firm* — Studebaker & Brackett PC

(57) ABSTRACT

Provided is a digital transmitting module included in a host device connectable to a client device. A digital transmitting module included in a host device connectable to a client device, the digital transmitting module may include: a clock generator which provides the host device with a clock whose one cycle is comprised of T1, T2, T3 and T4 connected sequentially, and a voltage encoder which receives the clock from the clock generator, receives a digital bit from the host device, generates a voltage pulse by encoding the digital bit based on the clock, and then transmits the voltage pulse to the client device.

3 Claims, 30 Drawing Sheets

(56) References Cited

U.S. PATENT DOCUMENTS

| | | |
|---|---|---|
| 9,553,635 B1 | 1/2017 | Sejpal et al. |
| 9,577,854 B1 | 2/2017 | Hollis |
| 2003/0112860 A1 | 6/2003 | Erdogan |
| 2010/0296589 A1 | 11/2010 | Maeda |
| 2014/0197976 A1* | 7/2014 | Pelley ............... H03M 5/02 341/182 |
| 2015/0049835 A1* | 2/2015 | Shibata ............ H04L 25/4919 375/287 |
| 2016/0080141 A1* | 3/2016 | Theiler ............. H04L 5/1423 375/353 |

FOREIGN PATENT DOCUMENTS

| | | |
|---|---|---|
| KR | 10-2004-0047789 A | 6/2004 |
| KR | 10-2008-0020802 A | 3/2008 |
| KR | 10-0910071 B1 | 7/2009 |
| WO | 2018/016854 A2 | 1/2018 |

OTHER PUBLICATIONS

World Intellectual Property Office, International Search Report for Application No. PCT/KR2017/007732; dated Mar. 14, 2018; 9 pages.

* cited by examiner (a) high-bit rate (b) low-bit rate

ASYNCHRONOUS DIGITAL COMMUNICATION MODULE

CROSS-REFERENCE TO RELATED APPLICATIONS

This application is a Continuation of U.S. patent application Ser. No. 16/251,720 filed Jan. 18, 2019, which is a Continuation of International Application No. PCT/KR2017/007732 filed Jul. 18, 2017, which claims benefit of priority to Korean Patent Application No. 10-2016-0091124 filed Jul. 19, 2016, the entire content of which is incorporated herein by reference.

TECHNICAL FIELD

The present disclosure relates to a digital communication module utilized for asynchronous serial communication and the like.

BACKGROUND ART

An embedded digital system generally performs asynchronous serial communication with other devices. In the field of telecommunications and computer science, serial communication generally refers to a process of continuously transmitting data one bit at a time through a communication channel or a computer bus. When data is continuously transmitted in such serial communication, a device at the receiving end needs a method of distinguishing each bit.

To recover data bits, a synchronization signal is simultaneously transmitted using a transmission line to inform the temporal location of the data. This is called synchronous communication.

The synchronous method requires a separate line for the synchronization signal. Thus, circuit configuration is more complicated than in an asynchronous transmission method in which only a data signal is transmitted, and the price of a released product is increased.

In a general asynchronous serial communication method, only a single power line for digital signal transmission exists between the transmitting end and the receiving end, and a clock signal for synchronization is not transmitted. In this case, since the receiving end performs data recovery using its own clock signal, only a slight difference between the clock of the transmitting end and the clock of the receiving end results in an error of the entire digital system.

Such fluctuation of the waveform of a digital pulse signal on a time axis is called jitter. For example, in a universal asynchronous serial receiver and transmitter (UART) method which is one of the most common asynchronous serial communication methods, it is known that a clock signal error should be within several % in consideration of the jitter problem at the transmitting end.

To maintain a clock error between the transmitting end and the receiving end within a specific range in asynchronous serial communication, the transmitting end and the receiving end should use the same crystal oscillator. However, adding such a separate element to an embedded digital system increases the cost of the communication system, thereby imposing a design burden.

Some methods for solving the above problem include Manchester code and bipolar code. The Manchester code is a method of encoding a digital signal by measuring a rising edge and a falling edge in a cycle, and the bipolar code is a method of repeatedly encoding low and high when 1 is repeatedly encoded.

In the case of the Manchester code, a loss of bandwidth is unavoidable because low and high should be repeatedly output for every bit. In the case of the bipolar code, the above-mentioned jigger problem occurs when 0 is successively encoded.

Therefore, in the asynchronous serial communication method, there is a need for a novel method by which the transmitting end efficiently encodes a clock signal together with data by considering a bit rate of the clock signal and the receiving end performs clock synchronization by effectively decoding and restoring the clock.

DISCLOSURE

Technical Problem

Aspects of the present disclosure provide a method by which a host device efficiently encodes a digital bit into a voltage pulse when performing asynchronous serial communication with a client device and a module employing the method.

Aspects of the present disclosure also provide a method by which a host device encodes a digital bit by considering a bit rate of the host device when encoding the digital bit into a voltage pulse to perform asynchronous serial communication with a client device and a module employing the method.

Aspects of the present disclosure also provide a method by which a client device decodes a voltage pulse encoded by a host device when the host device and the client device perform asynchronous serial communication using the above encoding method and a module employing the method.

Aspects of the present disclosure also provide a method by which a client device restores a clock signal provided by a host device and performs clock synchronization when the host device and the client device perform asynchronous serial communication using the above encoding method and a module employing the method.

Aspects of the present disclosure also provide a half-duplex asynchronous serial communication system composed of a host device employing the above encoding method and a client device employing the above decoding method.

Aspects of the present disclosure also provide a method by which a client device efficiently decodes a voltage pulse encoded according to the above encoding method by using an alternating current (AC)-coupling technique and a module employing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

According to an aspect of the inventive concept, there is provided, A digital transmitting module included in a host device connectable to a client device, the digital transmitting module comprising: a clock generator which provides the host device with a clock whose one cycle is comprised of T1, T2, T3 and T4 connected sequentially; and a voltage encoder which receives the clock from the clock generator, receives a digital bit from the host device, generates a voltage pulse by encoding the digital bit based on the clock, and then transmits the voltage pulse to the client device, wherein the voltage encoder generates the voltage pulse such that a voltage level of the voltage pulse is maintained at a first voltage level during T1 and T4, reduces the voltage level of the voltage pulse from the first voltage level to a second voltage level in an inpulse form during T2 of the clock and gradually increases the voltage level of the voltage pulse from the second voltage level to the first voltage level during T3 of the clock when the digital bit is 1 and gradually reduces the voltage level of the voltage pulse from the first voltage level to the second voltage level during T2 of the clock and increases the voltage level of the voltage pulse from the second voltage level to the first voltage level in the inpulse form during T3 of the clock when the digital bit is 0 or reduces the voltage level of the voltage pulse from the first voltage level to the second voltage level in the inpulse form during T2 of the clock and gradually increases the voltage level of the voltage pulse from the second voltage level to the first voltage level during T3 of the clock when the digital bit is 0 and gradually reduces the voltage level of the voltage pulse from the first voltage level to the second voltage level during T2 of the clock and increases the voltage level of the voltage pulse from the second voltage level to the first voltage level in the inpulse form during T3 of the clock when the digital bit is 1.

The digital transmitting module of claim 1, further comprising a signal modulator which adjusts the duration of T1 through T4 according to a required bit rate.

According to another aspect of the inventive concept, there is provided, A digital transmitting module included in a host device connectable to a client device, the digital transmitting module comprising: a clock generator which provides the host device with a clock whose one cycle is comprised of T1, T2, T3 and T4 connected sequentially; and a voltage encoder which receives the clock from the clock generator, receives a digital bit from the host device, generates a voltage pulse by encoding the digital bit based on the clock, and then transmits the voltage pulse to the client device, wherein the voltage encoder generates the voltage pulse such that a voltage level of the voltage pulse is maintained at a first voltage level during T1 and T4, reduces the voltage level of the voltage pulse from the first voltage level to a second voltage level in an inpulse form during T2 of the clock and increases the voltage level of the voltage pulse from the second voltage level to the first voltage level in the form of a step function having N steps during T3 of the clock when the digital bit is 1 and reduces the voltage level of the voltage pulse from the first voltage level to the second voltage level in the form of the step function having the N steps during T2 of the clock and increases the voltage level of the voltage pulse from the second voltage level to the first voltage level in the inpulse form during T3 when the digital bit is 0 or reduces the voltage level of the voltage pulse from the first voltage level to the second voltage level in the inpulse form during T2 of the clock and increases the voltage level of the voltage pulse from the second voltage level to the first voltage level in the form of the step function having the N steps during T3 of the clock when the digital bit is 0 and reduces the voltage level of the voltage pulse from the first voltage level to the second voltage level in the form of the step function having the N steps during T2 and increases the voltage level of the voltage pulse from the second voltage level to the first voltage level in the inpulse form during T3 when the digital bit is 0.

The digital transmitting module of claim 6, further comprising a signal modulator which adjusts the duration of T1 through T4 according to a required bit rate.

The digital transmitting module of claim 8, wherein, when the bit rate is changed, the signal modulator determines the number N of steps of the step function.

According to another aspect of the inventive concept, there is provided, A digital transmitting module included in a host device connectable to a client device, the digital transmitting module comprising: a clock generator which provides the host device with a clock whose one cycle is comprised of T1, T2, T3 and T4 connected sequentially; and a voltage encoder which receives the clock from the clock generator, receives a digital bit from the host device, generates a voltage pulse by encoding the digital bit based on the clock, and then transmits the voltage pulse to the client device, wherein the voltage encoder reduces a voltage level of the voltage pulse from a first voltage level to a second voltage level in an inpulse form during T2 of a clock corresponding to the digital bit, gradually increases the voltage level of the voltage pulse from the second voltage level to the first voltage level during T3 of the clock corresponding to the digital bit and maintains the voltage level of the voltage pulse at the second voltage level during a clock corresponding to a next digital bit when the digital bit is 1 and the next digital bit is 1 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 0 and the next digital bit is 0 or reduces the voltage level of the voltage pulse from the first voltage level to the second voltage level in the inpulse form during T2 of the clock corresponding to the digital bit, gradually increases the voltage level of the voltage pulse from the second voltage level to the first voltage level during T3 of the clock corresponding to the digital bit and maintains the voltage level of the voltage pulse at the second voltage level during the clock corresponding to the next digital bit when the digital bit is 0 and the next digital bit is 0 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 1 and the next digital bit is 1.

According to another aspect of the inventive concept, there is provided, A digital receiving module included in a client device connectable to a host device, the digital receiving module comprising: an inpulse extractor which receives a voltage pulse from the host device and generates an inpulse signal by referring to an inpulse component of the voltage pulse; a voltage decoder which decodes a digital bit by referring to the inpulse signal; and a clock synchronizer which generates a clock synchronized with a clock signal of the host device by referring to the inpulse component existing in each cycle of the inpulse signal.

According to another aspect of the inventive concept, there is provided, a transmitting end which generates a voltage pulse by encoding a digital bit and transmits the voltage pulse to another half-duplex digital communication device when the half-duplex digital communication device operates in a transmitting mode; and a receiving end which decodes a digital bit by receiving a voltage pulse from the another half-duplex digital communication device, provides the decoded digital bit to the half-duplex digital communication device and performs clock synchronization when the half-duplex digital communication device operates in a receiving mode, wherein the transmitting end comprises a clock generator which provides the half-duplex digital communication device with a clock whose one cycle is comprised of T1, T2, T3 and T4 connected sequentially and a voltage encoder which receives the clock from the clock generator, receives a digital bit from the host device, generates a voltage pulse by encoding the digital bit based on the clock and then transmits the voltage pulse to the another half-duplex digital communication device, and the receiving end comprises an inpulse extractor which receives a voltage pulse from the another half-duplex digital communication device through a single power line and generates an inpulse signal by referring to an inpulse component of the voltage pulse, a voltage decoder which decodes a digital bit by referring to the inpulse signal and a clock synchronizer which generates a clock synchronized with a clock of the another half-duplex digital communication device by referring to the inpulse component existing in each cycle of the inpulse signal, wherein the voltage encoder generates the voltage pulse such that a voltage level of the voltage pulse is maintained at a first voltage level during T1 and T4 of the clock, reduces the voltage level of the voltage pulse from the first voltage level to a second voltage level in an inpulse form during T2 of the clock and gradually increases the voltage level of the voltage pulse from the second voltage level to the first voltage level during T3 of the clock when the digital bit is 1 and gradually reduces the voltage level of the voltage pulse from the first voltage level to the second voltage level during T2 of the clock and increases the voltage level of the voltage pulse from the second voltage level to the first voltage level in the inpulse form during T3 of the clock when the digital bit is 0 or reduces the voltage level of the voltage pulse from the first voltage level to the second voltage level in the inpulse form during T2 of the clock and gradually increases the voltage level of the voltage pulse from the second voltage level to the first voltage level during T3 of the clock when the digital bit is 0 and gradually reduces the voltage level of the voltage pulse from the first voltage level to the second voltage level during T2 of the clock and increases the voltage level of the voltage pulse from the second voltage level to the first voltage level in the inpulse form during T3 of the clock when the digital bit is 1.

Advantageous Effects

According to the present disclosure, a host device can encode a digital bit by referring to a clock signal without using a separate high-performance element and perform digital communication with a currently connected client device using the encoded digital bit.

According to the present disclosure, a client device can decode a digital bit transmitted from a host device without using a separate high-performance element.

According to the present disclosure, a client device can restore a clock signal of a host device and perform clock synchronization with the clock signal of the host device without using a separate high-performance device.

According to the present disclosure, the power consumed in communication is reduced as compared with various conventional asynchronous digital bit encoding methods. Therefore, more efficient digital communication is possible.

According to the present disclosure, an error rate of digital communication is reduced as compared with various conventional asynchronous digital bit encoding methods. Therefore, more efficient digital communication is possible.

According to the present disclosure, a host device can adjust power consumption by easily changing a voltage pulse according to a change in a bit rate of a clock signal and can reduce an error rate of digital communication.

According to the present disclosure, a host device and a client device can effectively perform asynchronous serial communication using a half-duplex method.

However, the effects are not restricted to the one set forth herein. The above and other effects will become more apparent to one of daily skill in the art by referencing the claims.

DESCRIPTION OF DRAWINGS

These and/or other aspects will become apparent and more readily appreciated from the following description of the embodiments, taken in conjunction with the accompanying drawings in which.

MODE FOR INVENTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, embodiments of the inventive concept will be described in greater detail with reference to the attached drawings.

A host device, as used herein, denotes an electronic device operating on its own power. The host device is an electronic device including a clock for digital communication. A client device denotes a device performing various functions by being electrically connected to the host device. The client device may include its own clock which is, however, not an essential element by the nature of the client device.

The host device includes, but is not limited to, a computing device such as a personal computer, a notebook computer or a tablet computer or a mobile device such as a smartphone, an MP3 player or a portable media player (PMP).

The client device includes, but is not limited to, an earphone, headphone, headset, etc. connected to the computing device or the mobile device. Alternatively, the client device may be the computing device.

Figure 1:
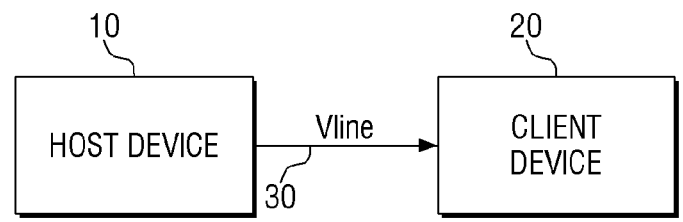
FIG. 1 is a schematic diagram of a digital communication system of a host device and a client device using a digital transmitting module according to an embodiment of the present disclosure and a digital receiving module according to another embodiment.

FIG. 1 is a schematic diagram of a digital communication system of a host device 10 and a client device 20 using a digital transmitting module according to an embodiment of the present disclosure and a digital receiving module according to another embodiment.

In some embodiments of the present disclosure, the host device 10 performs digital communication with the client device 20. To help understand the present disclosure, unidirectional communication in which the host device 10 transmits digital data to the client device 20 will be described as an example. However, the direction of data flow is not limited to this example. If the client device 20 includes its own clock, it can transmit digital data to the host device 10 according to an embodiment of the present disclosure.

The host device 10 and the client device 20 perform digital communication using an asynchronous serial communication method. Therefore, the host device 10 and the client device 20 are connected by a power line 30 for transmitting digital bits, but are not connected by a power line for transmitting a clock signal.

In the present disclosure, the host device 10 and the client device 20 perform digital communication using the voltage level of a voltage pulse Vline of the power line 30. The host device 10 and the client device 20 may also perform power communication using the power line 30 while performing digital communication using the voltage level. In this case, the digital communication system according to the present disclosure does not need to include a power line for supplying power to the client device 20.

Figure 2:
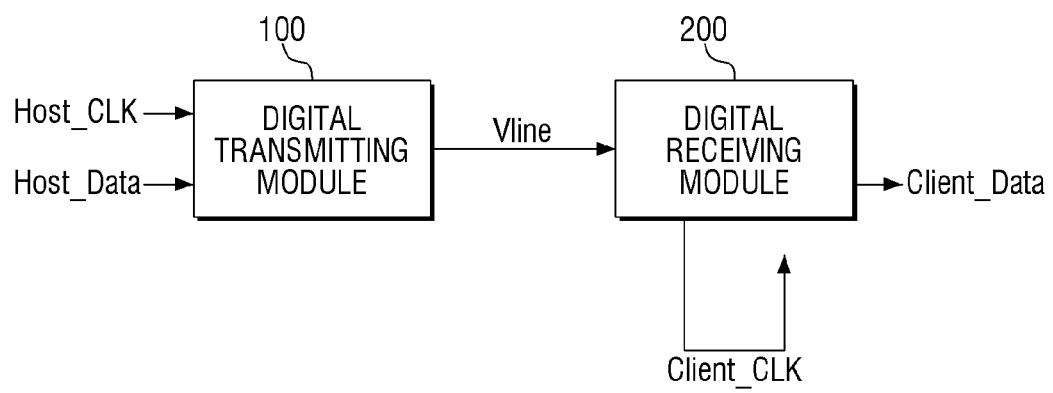
FIG. 2 is a schematic diagram of a digital communication system using a digital transmitting module according to an embodiment of the present disclosure and a digital receiving module according to another embodiment.

FIG. 2 is a schematic diagram of a digital communication system using a digital transmitting module 100 according to an embodiment of the present disclosure and a digital receiving module 200 according to another embodiment.

For asynchronous digital serial communication, the host device 10 may include the digital transmitting module 100 which generates a voltage pulse Vline by encoding digital bits of the host device 10 and transmits the voltage pulse Vline to the client device 20. The client device 20 may include the digital receiving module 200 which decodes the voltage pulse Vline received from the digital transmitting device 100 and provides the decoded voltage pulse Vline to the client device 20.

To help understand the present disclosure, a case where the host device 10 includes the digital transmitting module 100 and the client device 20 includes the digital receiving module 200 will be described as an example. However, the way that the host device 10 and the client device 20 include the digital transmitting module 100 and the digital receiving module 200 is not limited to this example. If the client device 20 intends to transmit data to the host 10 as described above, the client device 20 may include the digital transmitting module 100, and the host device 10 may include the digital receiving module 200.

The host device 10 and the client device 20 may perform not only unidirectional communication but also bidirectional communication using a half-duplex communication method. This will be described later.

When the host device 10 and the client device 20 perform bidirectional communication, each of the host device 10 and the client device 20 may include a digital transmitting/receiving module. This will be described later.

The digital transmitting module 100 according to an embodiment of the present disclosure and the digital receiving module 200 according to another embodiment will be described with reference to FIG. 2. The digital transmitting module 100 receives host digital data for digital communication from a data output terminal Host_Data of the host device 10. In addition, the digital transmitting module 100 receives a clock signal used for data sampling in digital communication from a clock signal output terminal Host_CLK of the host device 10.

Although the digital transmitting module 100 is expressed as receiving the clock signal Host_CLK of the host device 10 for the sake of convenience, the reception of the clock signal Host_CLK is not essential. The digital transmitting module 100 may also include its own clock and perform digital communication using the clock.

The digital transmitting module 100 encodes host digital data Host_Data into a voltage pulse Vline and transmits the voltage pulse Vline to the digital receiving module 200. The voltage pulse Vline may include both the host digital data Host_Data and the host clock signal Host_CLK. A method by which the digital transmitting module 100 encodes the voltage pulse Vline will be described later.

The digital receiving module 200 receives the voltage pulse Vline from the digital transmitting module 100. The digital receiving module 200 extracts a synchronization signal for clock synchronization from the voltage pulse Vline. By using the synchronization signal, the digital receiving module 200 restores a clock signal Client_CLK needed to sample the host digital data Host_Data transmitted by the digital transmitting module 100.

The digital receiving module 200 restores the asynchronous host digital data Host_Data for the client device 20 by decoding the voltage pulse Vline. The clock signal Client_CLK restored by the digital receiving module 200 is utilized in the process of sampling the asynchronous host digital data. The restored digital data Host_Data is provided to the client device 20 through a data input terminal Client_Data of the client device 20.

Figure 3:
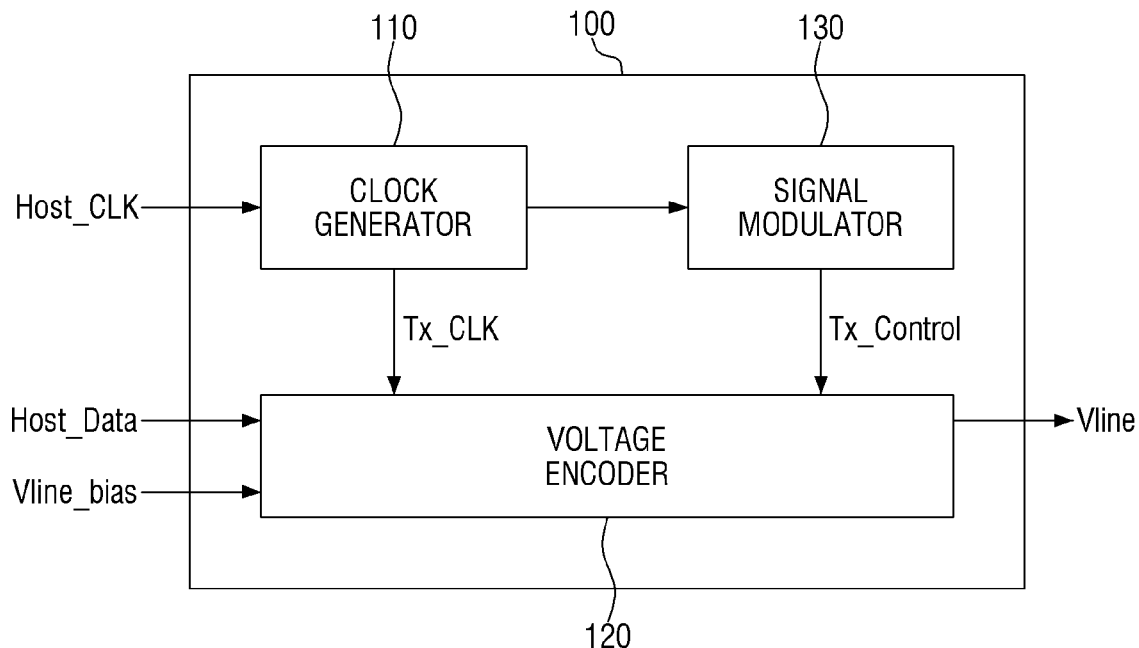
FIG. 3 is a block diagram of a digital transmitting module according to an embodiment of the present disclosure.

FIG. 3 is a block diagram of a digital transmitting module 100 according to an embodiment of the present disclosure.

The digital transmitting module 100 performs asynchronous serial communication with the digital receiving module 200 using a voltage pulse Vline. The digital transmitting module 100 may include a clock generator 110, a voltage encoder 120, and a signal modulator 130.

The clock generator 110 receives a host clock signal Host_CLK from the host device 10 or generates its own clock signal and provides a clock signal Tx_CLK to the voltage encoder 120.

The voltage encoder 120 receives host digital data Host_Data from the host device 10 and a signal modulation signal Tx_Control from the signal modulator 130. The voltage encoder 120 encodes digital bits of the digital data Host_Data into a voltage pulse Vline by referring to the clock signal Tx_CLK.

The signal modulator 130 generates the signal modulation signal Tx_Control for controlling the form of the voltage pulse Vline by referring to the clock Host_CLk of the host device 10 or the bit rate of the host digital data Host_Data and provides the signal modulation signal Tx_Control to the voltage encoder 120. The operation and configuration of each element included in the digital transmitting module 100 will be described later.

Figure 4:
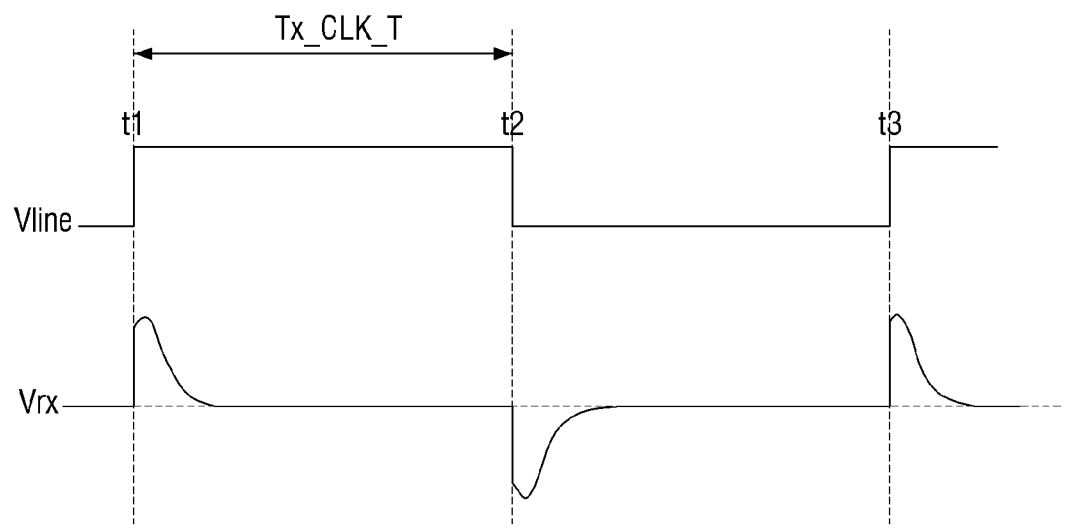
FIG. 4 is a timing diagram illustrating a voltage pulse and an inpulse component transmitted from a digital transmitting module to a digital receiving module in some embodiments of the present disclosure.

FIG. 4 is a timing diagram illustrating a voltage pulse Vline and an inpulse component Vrx transmitted from a digital transmitting module to a digital receiving module in some embodiments of the present disclosure.

A digital data encoding technique utilized in the present disclosure will be described with reference to FIG. 4. In digital communication, 0 and 1 are generally expressed as low and high, and the communication power line 30 transmits digital data through repetition of low and high of a voltage pulse Vline. A receiving end Rx receives desired information by sampling the low or high voltage level of the voltage pulse Vline as a digital communication clock.

For a better understanding, a signal obtained by extracting a high-frequency component from a voltage pulse Vline transmitted from the host device 10 to the client device 20 will be expressed herein as an inpulse component Vrx. An inpulse waveform theoretically refers to a waveform having an infinite value for a very short time, but is used herein to express a rising or falling edge of the voltage level. However, the use of such terms in the present specification is not intended to limit the present disclosure to an ideal inpulse function. The present disclosure extracts inpulse components existing in a voltage pulse Vline and utilizes the inpulse components as a reference for data encoding.

All signals including analog and digital signals may be represented by superposition of signals having various frequency values. The frequency of a calculation function may be 0 (DC) while a constant value is maintained. However, the step function may also have a certain frequency at a rising or falling edge. This frequency ideally has an infinite value but, when an actual circuit is implemented, has a sufficiently high frequency value.

Therefore, if frequency components are extracted from a signal shown at the top of FIG. 4, an inpulse component signal Vrx shown at the bottom can be obtained. As the voltage pulse Vline has a rising edge at a time t1, the inpulse component signal Vrx has a positive (+) value momentarily. As the voltage pulse Vline has a falling edge at a time t2, the inpulse component Vrx has a negative (−) value momentarily.

In actual implementation, it is impossible to implement a perfect step function. Therefore, the inpulse component signal Vrx may actually rise rapidly and then fall gradually as shown at the bottom of FIG. 4. A method of extracting inpulse components Vrx from a voltage pulse Vline will be described later together with the digital receiving module 200.

Figure 5A:
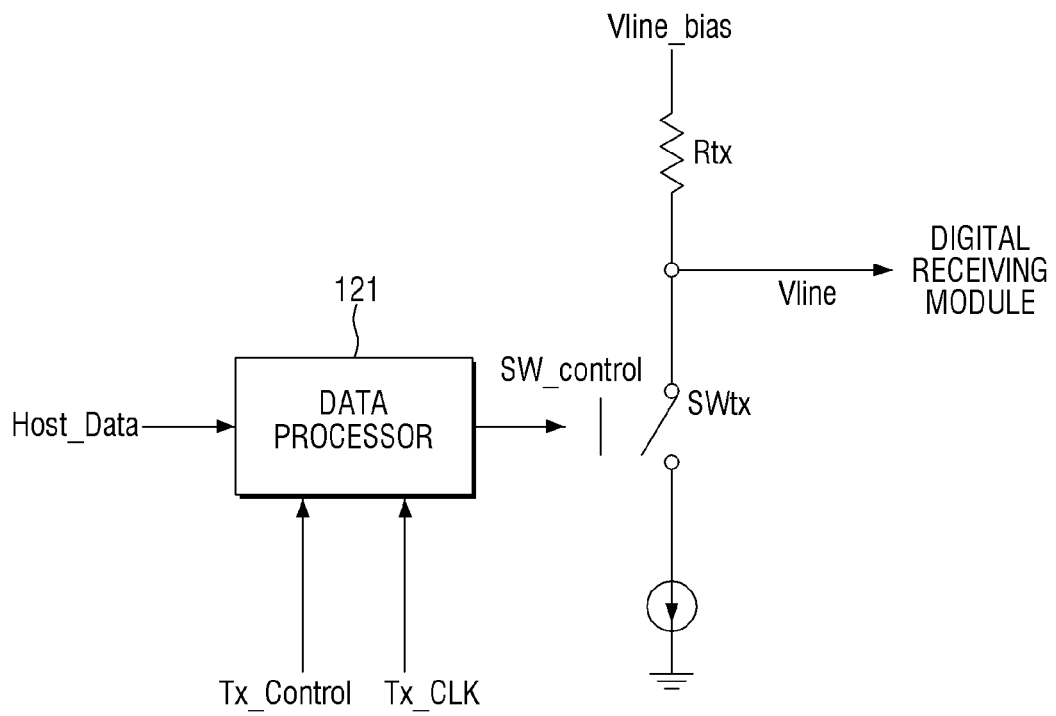
FIG. 5A is a detailed circuit diagram of a voltage encoder illustrated in FIG. 3.
Figure 5B:
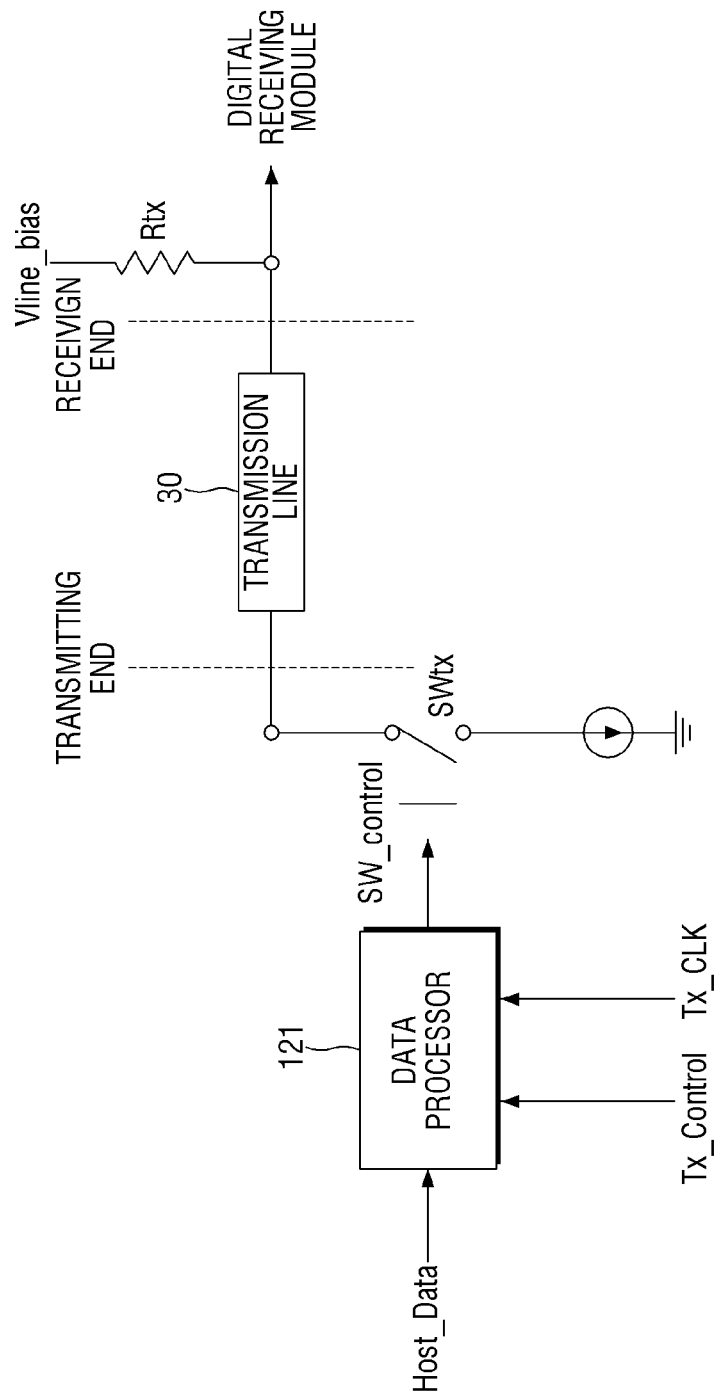
FIG. 5B is a detailed circuit diagram of another embodiment of the voltage encoder.

FIG. 5A is a detailed circuit diagram of the voltage encoder 120 illustrated in FIG. 3. FIG. 5B is a detailed circuit diagram of another embodiment of the voltage encoder 120 illustrated in FIG. 3.

A method of generating the voltage pulse Vline described in FIG. 4 will be described with reference to FIGS. 5A and 5B. To generate the voltage pulse Vline, the voltage encoder 120 receives host digital data Host_Data from the host device 10 and a host clock signal Tx_CLK from the clock generator 110.

A data processor 121 generates a signal SW_control for generating the voltage pulse Vline by referring to the host clock signal Tx_CLK. The signal controls a SWtx 123 which is a switch for generating the voltage pulse Vline. The voltage encoder 120 may receive a bias voltage Vline_bias for generating the voltage pulse Vline from the host device 10.

When the switch is closed, a voltage drop occurs at a Vline node due to a current Itx of a direct current (DC) current source 124 and a bias resistor Rtx (122) in the circuit. The value of the voltage drop is Vline=Vline_bias−Itx×Rtx. The voltage encoder 120 may encode the voltage pulse Vline by controlling the SWtx 124.

The bias voltage Vline_bias may be received by the digital transmitting module 100 from the host device 10, but may also be received from the client device 20. In this case, the digital receiving module 200 may receive the bias voltage Vline_bias from the client device 20 and include a bias resistor Rtx (122*a*).

The voltage encoder 120 generates a voltage drop at the Vline node using the DC current source 124 existing in the digital receiving module 100. An embodiment in which the host device 10 provides the bias voltage Vline_bias to the voltage encoder 120 is illustrated in FIG. 5A, and an embodiment in which the client device 20 provides the bias voltage Vline_bias to the voltage encoder 120 is illustrated in FIG. 5B.

The internal circuit structure of the voltage encoder 120 is merely an example used to describe the present disclosure in detail, and the present disclosure is not limited to the above circuit.

Figure 6:
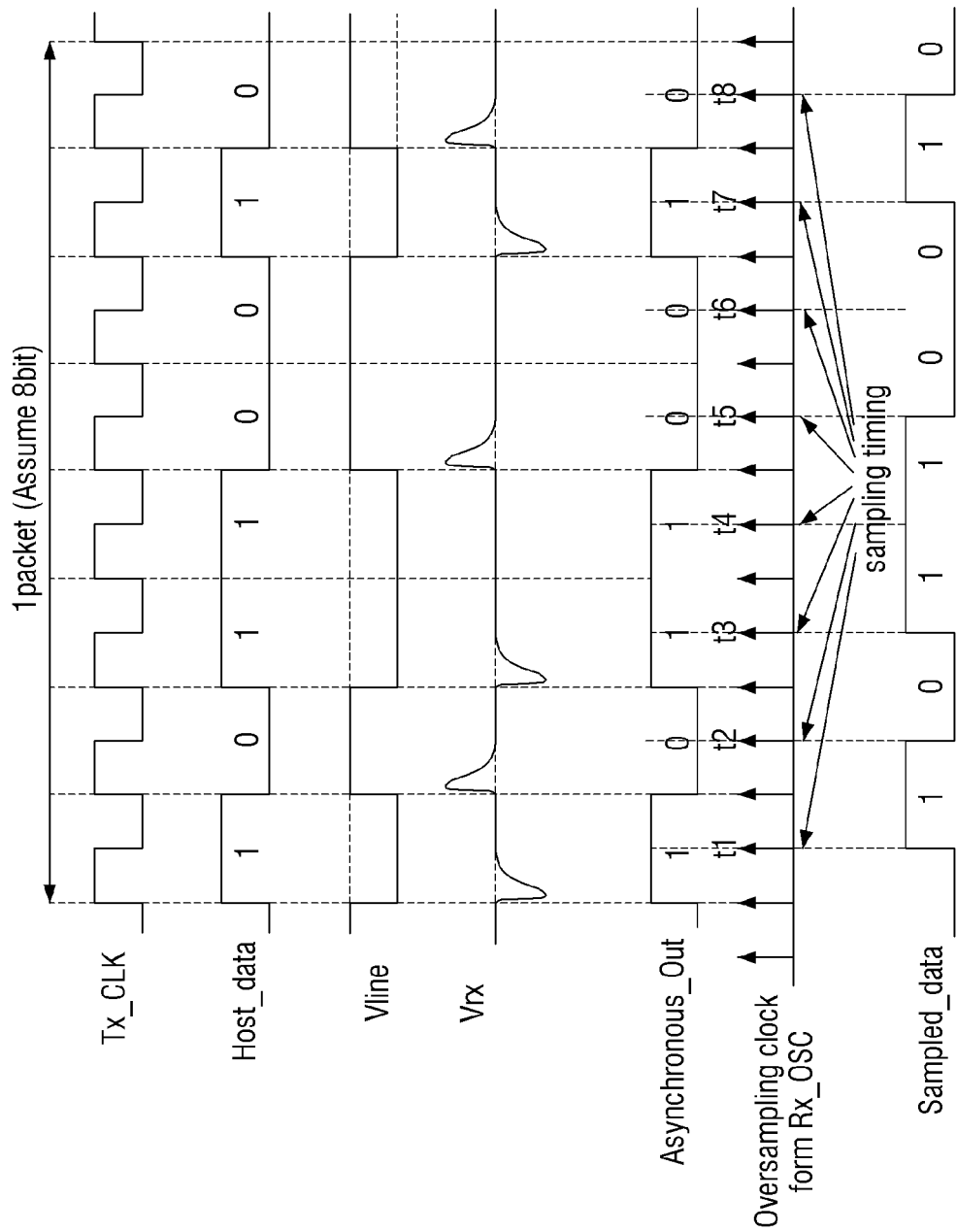
FIG. 6 is a timing diagram for explaining digital communication performed using a voltage pulse and an inpulse component in some embodiments of the present disclosure.

FIG. 6 is a timing diagram for explaining digital communication performed using a voltage pulse Vline and an inpulse component Vrx in some embodiments of the present disclosure.

To help understand the present disclosure, a case where the value of host digital data is "10110010" will be described as an example. When 1 is input as a digital bit value of the host digital data Host_Data, the data processor 121 outputs 1 as a SW_control value, and the SWtx 123 is closed when 1 is input as the SW_control value. Therefore, the host digital data Host_Data and the voltage pulse VL are inverted from each other. The response of the data processor 121 and the SW_control bit is not limited to the above embodiment.

Therefore, when the value of the host digital data Host_Data changes from 0 to 1, the voltage level of an inpulse component signal Vrx shows a falling edge. Conversely, when the value of the host digital data Host_Data changes from 1 to 0, the voltage level of the inpulse component signal Vrx shows a rising edge.

The digital receiving module 200 may restore asynchronous digital data Asynchronous_out by referring to the direction or sign of the inpulse component signal Vrx.

If the above encoding method is used, it is not possible to perform decoding simply by mapping the sign of an inpulse component to a digital bit value because the inpulse component exists only at a rising or falling edge of a voltage pulse.

Therefore, the digital receiving module 200 may determine that a previous bit has changed from 0 to 1 when a negative (−) inpulse component exists and determine that the previous bit has changed from 1 to 0 when a positive (+) inpulse component exists.

A circuit for determining the sign of an inpulse component in the digital receiving module 200 will be described later. Asynchronous_out in FIG. 6 indicates the result of restoring the host digital data Host_data by referring to the inpulse component signal Vrx. It can be seen that Asynchronous_out is "10110010" which is identical to Host_Data.

In a digital system, a signal obtained by decoding a voltage pulse Vline is not directly applied a device. The receiving end Rx of digital communication generally obtains final data by sampling the asynchronous digital data Asynchronous_out. The final result of sampling the asynchronous digital data Asynchronous_out is shown as Sampled data at the bottom of the drawing.

Figure 7:
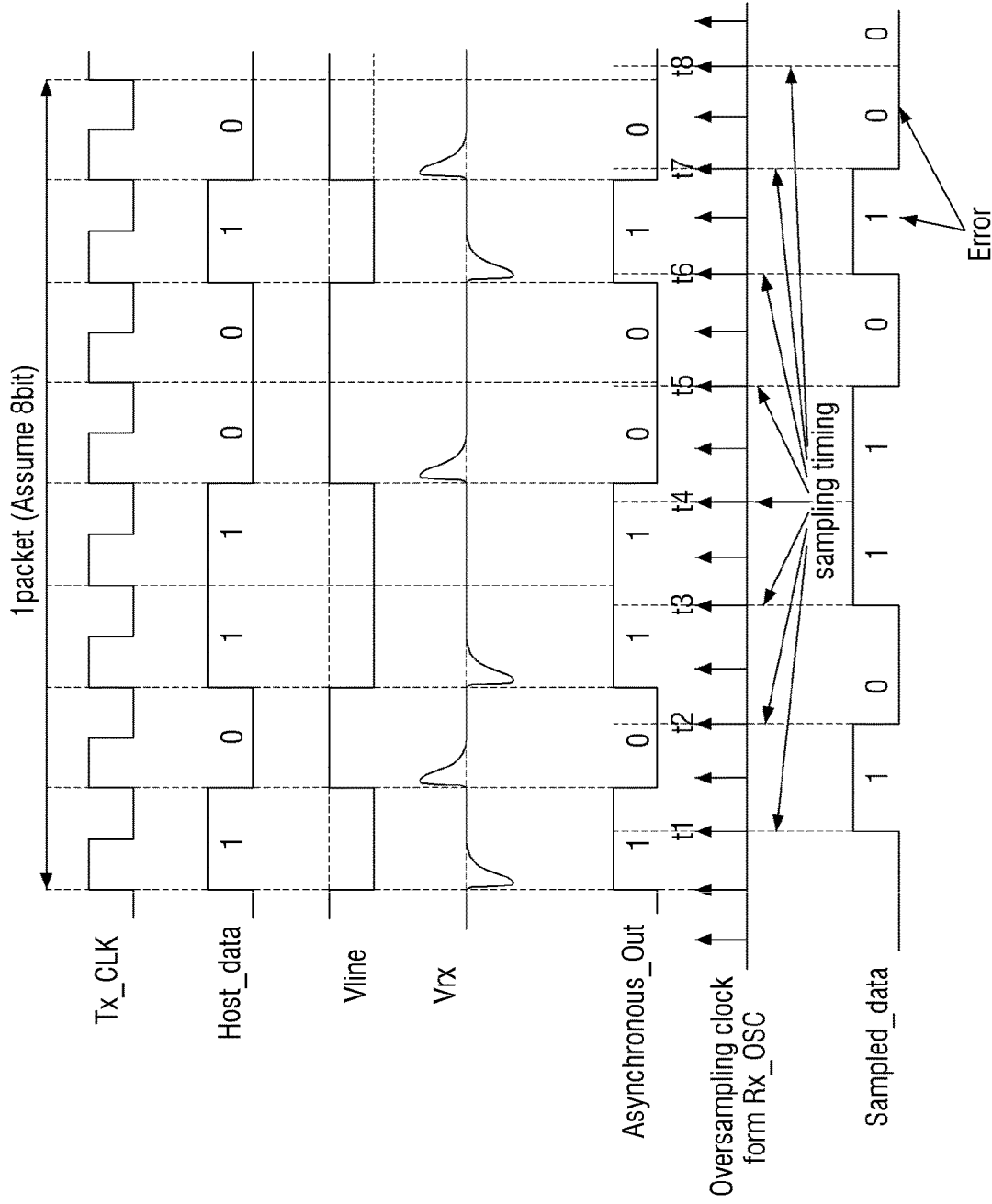
FIG. 7 is a timing diagram for explaining a problem occurring in digital communication performed using a voltage pulse and an inpulse component in some embodiments of the present disclosure.

FIG. 7 is a timing diagram for explaining a problem occurring in digital communication performed using a voltage pulse Vline and an inpulse component Vrx in some embodiments of the present disclosure.

Generally, when the receiving end Rx of an asynchronous digital system samples a voltage pulse Vline, it uses a clock signal Rx_OSC utilizing a crystal oscillator included in the receiving end Rx or uses a synchronization signal transmitted from the transmitting end Tx.

According to the digital communication method described with reference to FIGS. 5 and 6, a voltage pulse Vline is transmitted through the single power line 30 and does not include a synchronization signal. Thus, the above method may cause the problem of jitter. As described above, jitter refers to the fluctuation of the waveform of a digital pulse signal on a time axis. To reduce sampling errors, the receiving end generally uses a clock (Oversampling clock from Rx_OSC) having a frequency higher than that of a host clock Host_CLK.

The frequency of the Oversampling clock is not an exact multiple of the frequency of the host clock Host_CLK. Therefore, if the bit arrangement of a single packet becomes long, an error may occur in data communication due to frequency mismatch. Referring to Sampled_data of FIG. 7, jitter occurs at a time when a cycle of t6 starts. For host digital data input as "10110010", the client device 20 obtains client digital data of "10110100".

To solve the above jitter problem occurring when the asynchronous communication method is used, the digital transmitting module 100 may encode the voltage pulse Vline of the single power line 30 together with a clock synchronization signal and transmit the encoding result to the digital receiving module 200.

Figure 8:
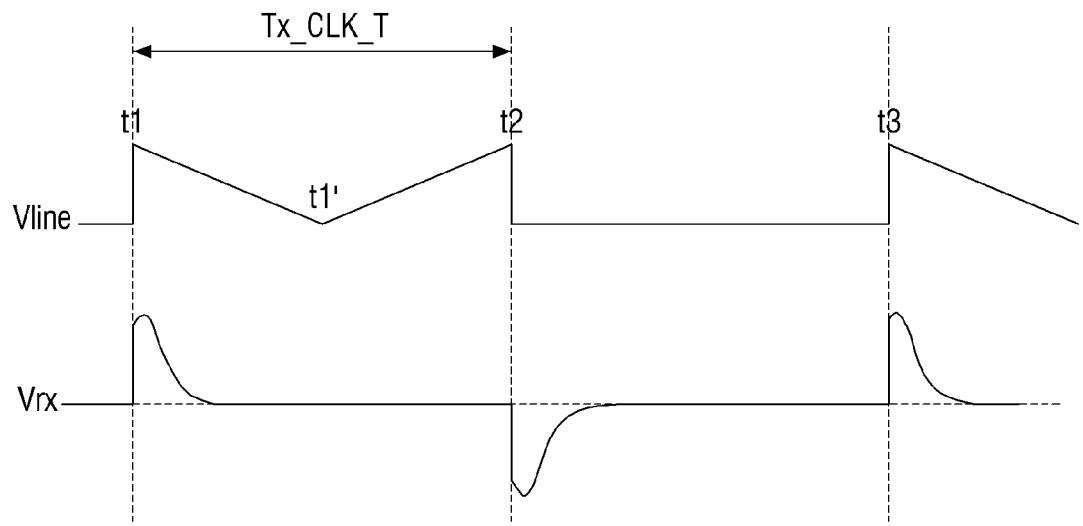
FIG. 8 is a timing diagram illustrating another embodiment of a voltage pulse and an inpulse component transmitted from the digital transmitting module to the digital receiving module in some embodiments of the present disclosure.

FIG. 8 is a timing diagram for explaining another embodiment of a voltage pulse Vline and an inpulse component Vrx transmitted from the digital transmitting module 100 to the digital receiving module 200 in some embodiments of the present disclosure.

A voltage pulse encoding method that overcomes the problem of the embodiment described in FIG. 7 will be described with reference to FIG. 8. A voltage pulse Vline illustrated in FIG. 8 is different from the voltage pulse Vline illustrated in FIG. 3 in that it is in the form of a ramp function, that is, the voltage level of the voltage pulse Vline falls with a constant slope and then rises again for one cycle after a rising edge.

Since an inpulse component is the result of extracting, as a signal, a high-frequency component from a signal, if the voltage level of the voltage pulse Vline changes relatively slowly, an inpulse component Vrx according to the change is not detected. Therefore, no inpulse component is detected despite a change in the voltage level of the voltage pulse Vline.

Even in this case, since a rising edge or a falling edge exists at times t1, t2 and t3, an inpulse component signal Vrx generates an inpulse component every cycle. If the inpulse component generated every cycle is used, it is possible to simultaneously transmit digital data and a signal for clock synchronization by using one voltage pulse Vline.

In digital communication, the performance of a technique for encoding digital bits into a specific form of voltage pulse Vline may be evaluated according to various factors. Of the factors, implementing a circuit at a relatively low cost is an important factor. In circuit implementation, it is relatively difficult to generate a signal in the form of a ramp function. Therefore, a gradual change of a voltage pulse may be implemented in the form of a step function to reduce the cost of circuit design. This method will be described later.

In addition, if the voltage pulse Vline is transmitted together with a synchronization signal, it is not necessary for a circuit designer to additionally design a power line for the synchronization signal, thereby reducing the design cost.

Another evaluation factor is power consumption. As the digital communication technology develops, more information is transmitted from the transmitting end Tx to the receiving end Rx through digital communication than before. Since the power required to generate a voltage pulse Vline necessary for digital communication is proportional to the square of a voltage, it may be proportional to the square of the area formed by the voltage pulse Vline in the timing diagram of the voltage pulse Vline.

Comparing the voltage pulses Vline of FIGS. 4 and 8, it can be seen that the embodiment of FIG. 8 is better than that of FIG. 4 in terms of power consumption.

The voltage level of the voltage pulse Vline of FIG. 8 falls to a reference level and then rises to a maximum value during Tx_CLK. Accordingly, the area drawn by the voltage pulse Vline is reduced to half the area drawn by the voltage pulse Vline of FIG. 4.

Therefore, the encoding method suggested in FIG. 8 can be used to implement a digital communication module improved in terms of power consumption.

Figure 9:
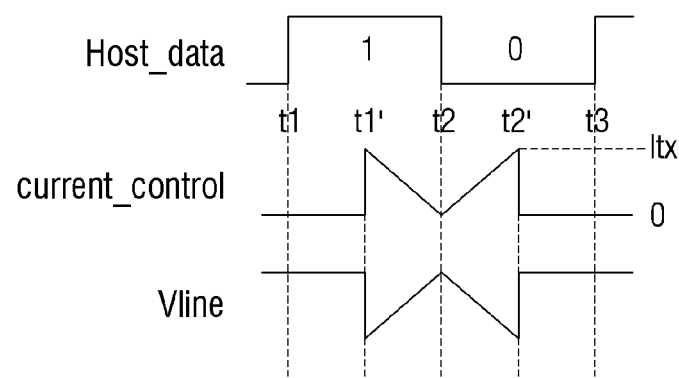
FIG. 9 is a timing diagram for explaining the result of encoding data bits of 0 and 1 into a voltage pulse using the voltage encoder according to some embodiments of the present disclosure.

FIG. 9 is a timing diagram for explaining a method by which the voltage encoder 120 encodes data bits of 0 and 1 into a voltage pulse Vline according to some embodiments of the present disclosure.

An embodiment of a data encoding method suggested in the present disclosure will be described with reference to FIG. 9. If a signal in the form described in FIG. 8 is used, an inpulse signal can be generated every cycle. However, if the same digital bits are successively received (0→0 or 1→1), no inpulse component is detected. To solve this problem, a digital encoding method of FIG. 9 is suggested.

A voltage pulse Vline of FIG. 9 is different from the voltage pulse Vline of FIG. 8 in that at least one rapid voltage level change (rising or falling edge) occurs every cycle regardless of the type of a digital bit.

Specifically, when a digital bit of 1 is input, the voltage level of the voltage pulse Vline maintains a constant value during a period from t1 to t1', rapidly falls at the time t1' (a falling edge), and then gradually returns to a reference voltage level.

On the other hand, when a digital bit of 0 is input, the voltage level of the voltage pulse Vline gradually falls during a period from t2 to t2' and then returns to the reference voltage level at the time t2'. A bit value matching method according to the encoding is not limited to the above embodiment.

Figure 10A:
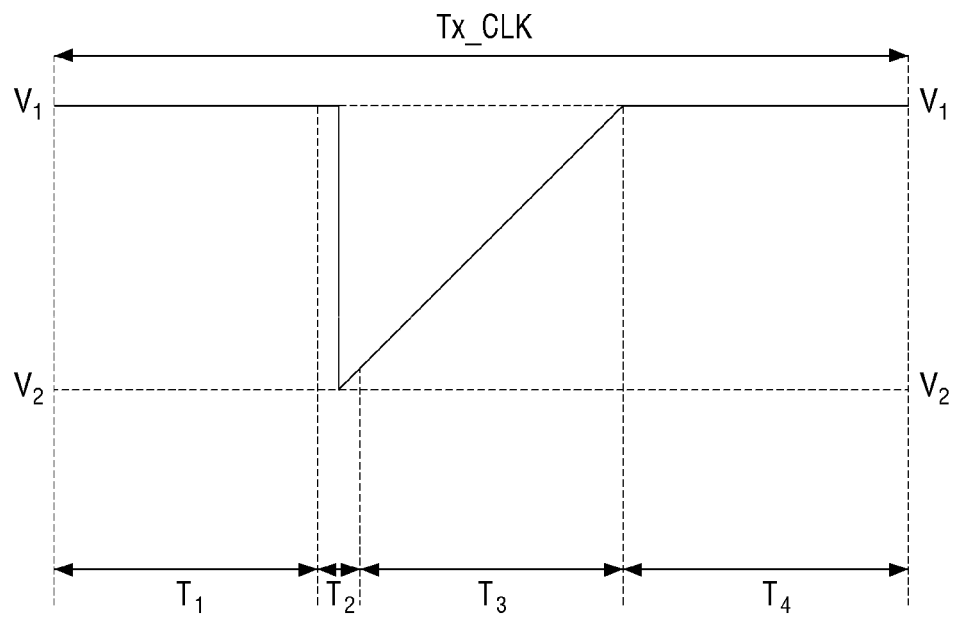
FIGS. 10A and 10B are timing diagrams for explaining the timing diagram of the voltage pulse of FIG. 9 in more detail.
Figure 10B:
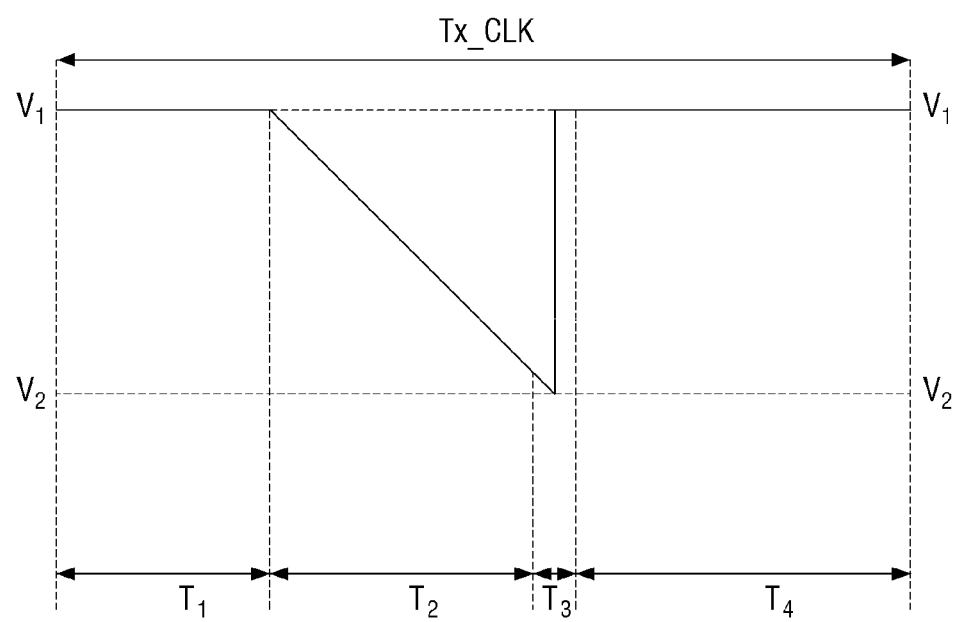

FIGS. 10A and 10B are timing diagrams for explaining the timing diagram of the voltage pulse Vline of FIG. 9 in more detail.

Elements of one cycle of the voltage pulse Vline illustrated in FIG. 9 will be defined with reference to FIGS. 10A and 10B. According to the above description, the voltage pulse Vline includes at least one rising or falling edge and a gradual return to a reference voltage level in each host clock cycle Host_CLK.

In the present specification, one host clock cycle Tx_CLK1 may consist of smaller time units T1, T2, T3 and T4. Therefore, Tx_CLK=T1+T2+T3+T4.

In addition, the reference voltage level of the voltage pulse Vline is defined as a first voltage level V1, and a voltage level reached by the voltage pulse according to a rapid voltage level change (a rising or falling edge) is defined as a second voltage level V2. The present disclosure is not limited to a case where the first voltage level V1 is higher than the second voltage level V2. The first voltage level V1 may also be lower than the second voltage level V2 depending on the direction of a current.

Specifically, T1 indicates a period of time during which the voltage level of the voltage pulse Vline is maintained at the first voltage level V1 before it is changed. T4 indicates a period of time during which the voltage level of the voltage pulse Vline is maintained at the first voltage level after it is changed.

Referring to FIG. 10A, T2 indicates a very short period of time during which the voltage level rapidly falls from the first voltage level V1 to the second voltage level V2 (a falling edge). The value of T2 ideally converges to zero, but may be defined as a very short period in circuit implementation. T3 indicates a period of time during which the voltage level of the voltage pulse Vline fallen to the second voltage level V2 gradually returns to the first voltage level V1.

Referring to FIG. 10B, T2 indicates a period of time during which the voltage level gradually falls from the first voltage level to the second voltage level. In this case, T3 indicates a period of time during which the voltage level of the voltage pulse Vline fallen during T2 rapidly rises from the second voltage level V2 to the first voltage level V1.

T1 through T4 may be flexible values satisfying Tx_CLK=T1+T2+T3+T4. T1 or T4 may also have a value of 0. In this case, a voltage pulse whose voltage level changes with the start of a cycle may be obtained. Controlling the lengths of T1 through T4 using the digital transmitting module 100 will be described later together with the signal modulator 130.

Figure 11:
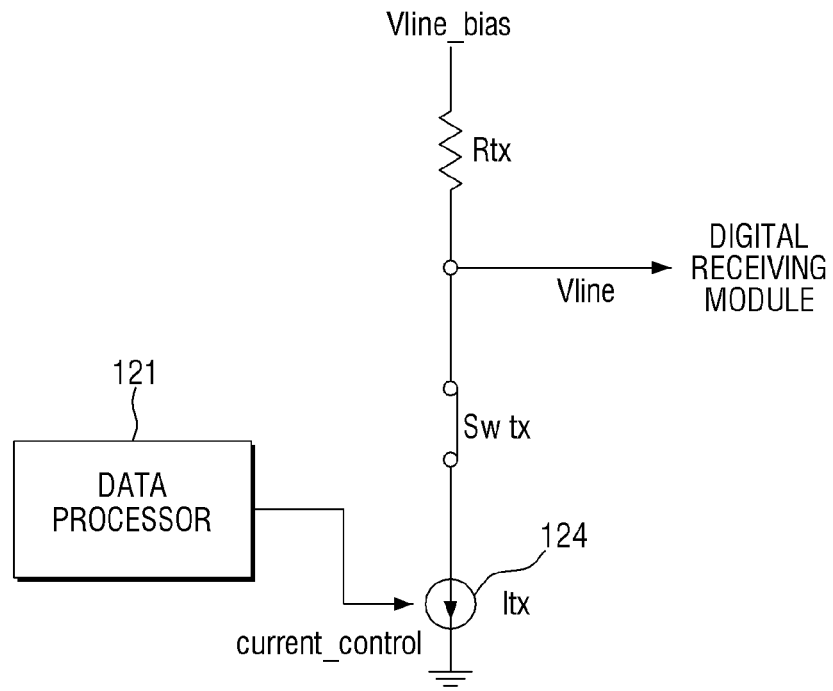
FIG. 11 is a detailed circuit diagram of another embodiment of the voltage encoder illustrated in FIG. 3.

FIG. 11 is a detailed circuit diagram of another embodiment of the voltage encoder 120 illustrated in FIG. 3.

The circuit diagram of FIG. 11 is different from those of FIGS. 5A and 5B in that an output value of a data processor 121 does not control a current control switch SW_tx (123), but directly controls a current value of a DC current source 124.

This is because simply opening or closing the switch is not sufficient due to a variable change in the amount of current, unlike in the above-described embodiments. A signal used by the data processor 121 to control the DC current source 124 is defined as current control.

As described above, when the current level of the DC current source is changed, a voltage drop occurs at a Vline node. The digital transmitting module 100 may encode a voltage pulse Vline using the voltage drop.

This internal circuit structure of the voltage encoder 120 is merely an example used to describe the present disclosure in detail, and the scope of the present disclosure is not limited to the above circuit.

Figure 12:
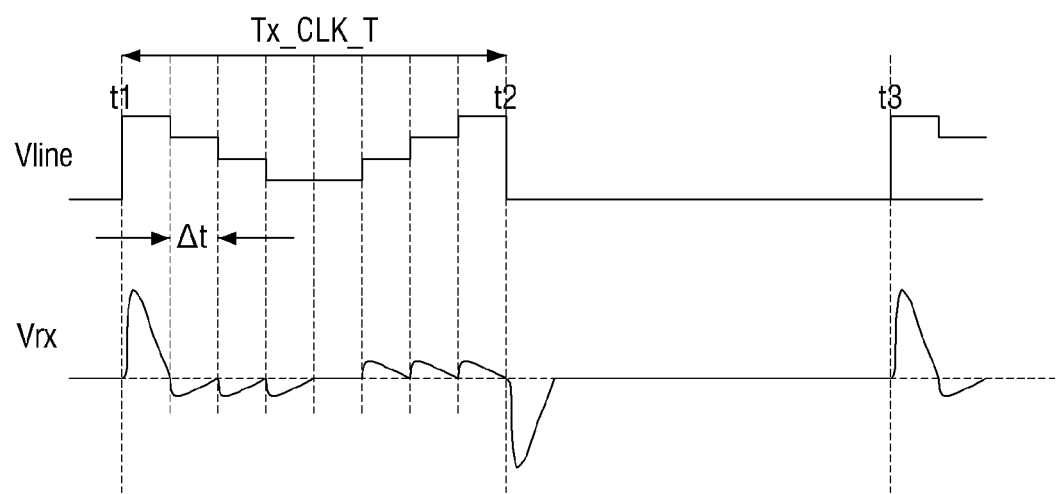
FIG. 12 is a timing diagram illustrating another embodiment of a voltage pulse and an inpulse component transmitted from the digital transmitting module to the digital receiving module in some embodiments of the present disclosure.

FIG. 12 is a timing diagram for explaining another embodiment of a voltage pulse Vline and an inpulse component Vrx transmitted from the digital transmitting module 100 to the digital receiving module in some embodiments of the present disclosure.

An embodiment improved from the embodiment of FIG. 8 will be described with reference to FIG. 12. A voltage pulse Vline of FIG. 12 is different from the voltage pulse Vline of FIG. 8 in that its voltage level rises or falls in the form of a step function having a plurality of steps instead of gradually rising or falling (in the form of a ramp function) during the period from t1 to t1' and the period from t1' to t2. Here, a time interval during which the voltage level of each step function is maintained is defined as Δt. The number of time intervals Δt during which each voltage level of the step function is maintained may be, but is not limited to, equal to the number of steps.

If an ideal ramp function is used as in FIG. 8, an inpulse component Vrx is hardly detected in a section in which the voltage level value of the voltage pulse Vline gradually increases or decreases. Therefore, an inpulse component signal Vrx in a more neat form can be obtained.

However, since it is difficult to design the ramp function in actual circuit design, the embodiment of FIG. 12 is suggested. Referring to an inpulse component signal Vrx shown at the bottom, not only an inpulse component due to a rising or falling edge of the voltage level but also relatively small inpulse components are detected because the value of the voltage pulse Vline changes discontinuously according to each step function, unlike the above description.

The voltage level of each step function may be set smaller than a difference between the first voltage level V1 and the second voltage level V2. If a smaller voltage level change is measured during the same time, it means that a relatively small value is detected when a frequency component is extracted.

Therefore, absolute values of voltage levels of inpulse components due to the step functions are smaller than an absolute value of a voltage level of an inpulse component extracted when the voltage level of the voltage pulse Vline rapidly changes from the first voltage level V1 to the second voltage level V2 (a rising edge or a falling edge).

Thus, in order to use this method of encoding the voltage pulse Vline, the digital receiving module 200 is additionally required to compare an absolute value of a voltage level of an inpulse component signal Vrx with a specific value and extract only inpulse components exceeding the specific value Vref from the inpulse component signal Vrx. This will be described later in relation to the digital receiving module 200.

Figure 13:
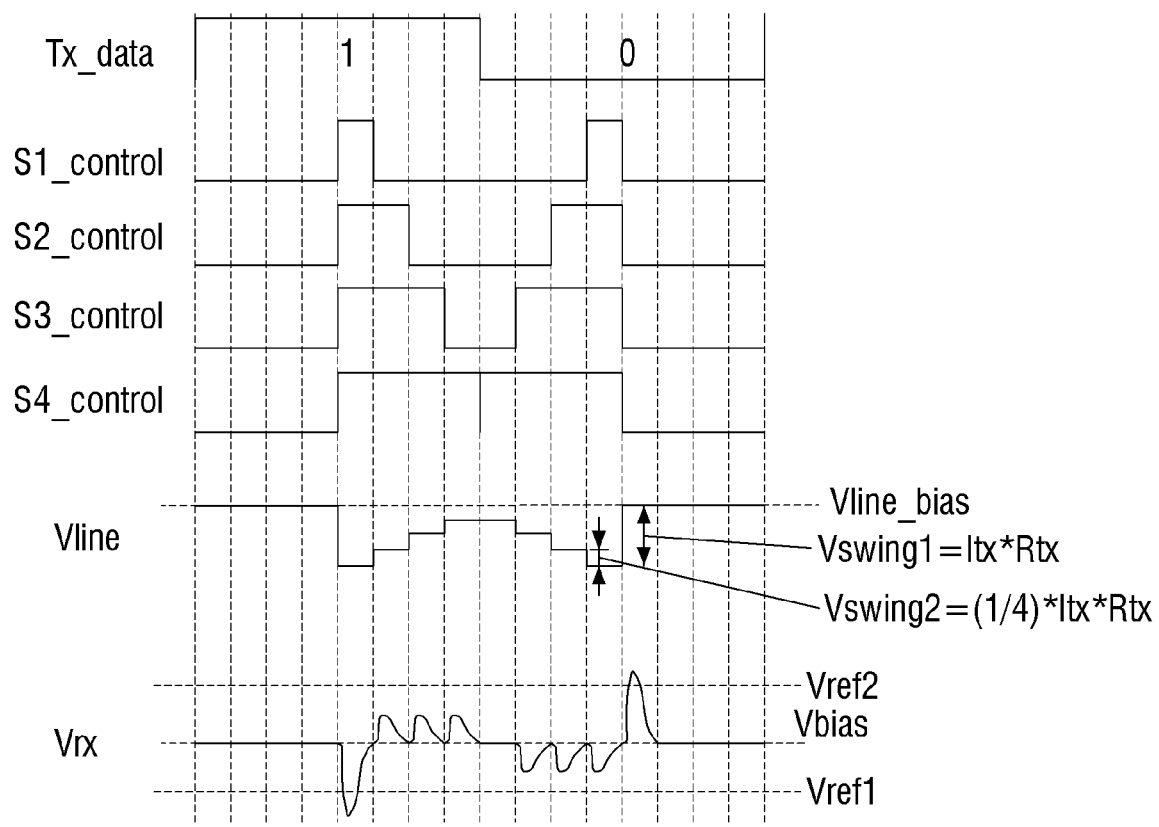
FIG. 13 is a timing diagram for explaining a method by which the digital transmitting module generates the voltage pulse and the inpulse component of FIG. 12 according to some embodiments of the present disclosure.

FIG. 13 is a timing diagram for explaining a method by which the digital transmitting module 100 generates the voltage pulse Vline and the inpulse component Vrx of FIG. 12 according to some embodiments of the present disclosure.

A method of encoding the voltage pulse Vline of FIG. 9 using a step function will be described with reference to FIG. 13. In the present disclosure, the number of steps of a step function used for the discontinuous rise or fall in the voltage level of a voltage pulse Vline is defined as N. In FIG. 13, a case where N=4 is described as an example. This value of N is merely an example, and the present disclosure is not limited to this example.

The voltage pulse Vline can be increased or decreased step by step by controlling the operation of N switches. In FIG. 13, timing diagrams of signals S1_control through S4_control for controlling switches S1 through S4 are illustrated. Each switch controls a current value obtained by dividing Itx, which is generated by the DC current source of the voltage encoder 120, by the number N of switches.

Therefore, in the above example, each switch controls a current value of 1/4× Itx. For example, when 1 is input as a bit value, a falling edge occurs, and all of S1_control through S4_control have high values until their values increase according to a first step function. In this case, all of the four switches are closed. Therefore, a voltage value satisfying Vline_bias−(¼)*Itx 4*Rtx is generated at the Vline node.

Then, as the switches are opened one by one, the voltage pulse Vline takes the form of a step function. If the voltage value of the first voltage level V1 is equal to Vline_bias, the second voltage level V2 and Itx satisfy the following equation.

First voltage level=$V$line_bias=second voltage level+ (1/$NSI_{tx}$)$SNSR_{tx}$     (1).

An inpulse component signal Vrx extracted from the voltage pulse Vline encoded according to the above method is shown at the bottom of the drawing. The digital receiving module 200 performs digital communication by extracting Vrx only when the value of Vrx is smaller than the value of Vref1 or larger than the value of Vref2. This will be described later. In addition, the above method of implementing the voltage pulse Vline in the form of a step function is merely an example, and the present disclosure is not limited to this method.

Figure 14:
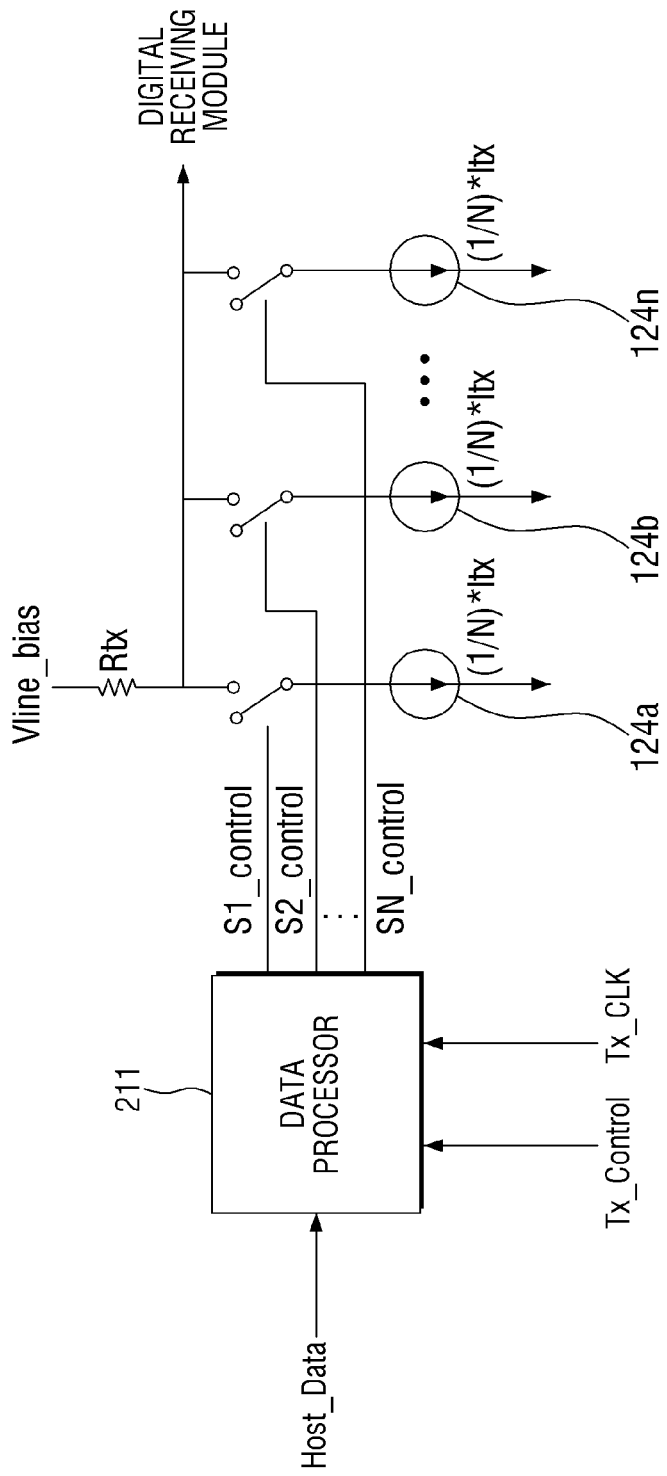
FIG. 14 is a detailed circuit diagram of another embodiment of the voltage encoder illustrated in FIG. 13.

FIG. 14 is a detailed circuit diagram of another embodiment of the voltage encoder 120 illustrated in FIG. 13.

A circuit diagram for generating a voltage pulse Vline according to the timing diagram of FIG. 13 will be described with reference to FIG. 14. A voltage encoder 120 may include a plurality of switches 124a through 124n to generate a voltage pulse Vline that rises and falls in the form of a step function.

A data processor 121 outputs a plurality of switch control signals S1_control through SN_control for controlling the switches 124a through 124n. To increase or decrease the voltage level of the voltage pulse Vline using N steps of the step function, N switches and N control signals are required.

As will be described later, the value of N may be set flexibly by the signal modulator 130. The voltage encoder 120 encodes host digital data Host_Data and a host clock signal Host_CLK into one voltage pulse using a voltage drop generated by the switches 124a through 124n and transmits the one voltage pulse to the digital receiving module 200.

If the present disclosure is implemented through the above circuit, a circuit can be configured more easily than in the embodiment of FIG. 11. This internal circuit structure of the voltage encoder 120 is merely an example used to describe the present disclosure in detail, and the present disclosure is not limited to the above circuit.

Figure 15:
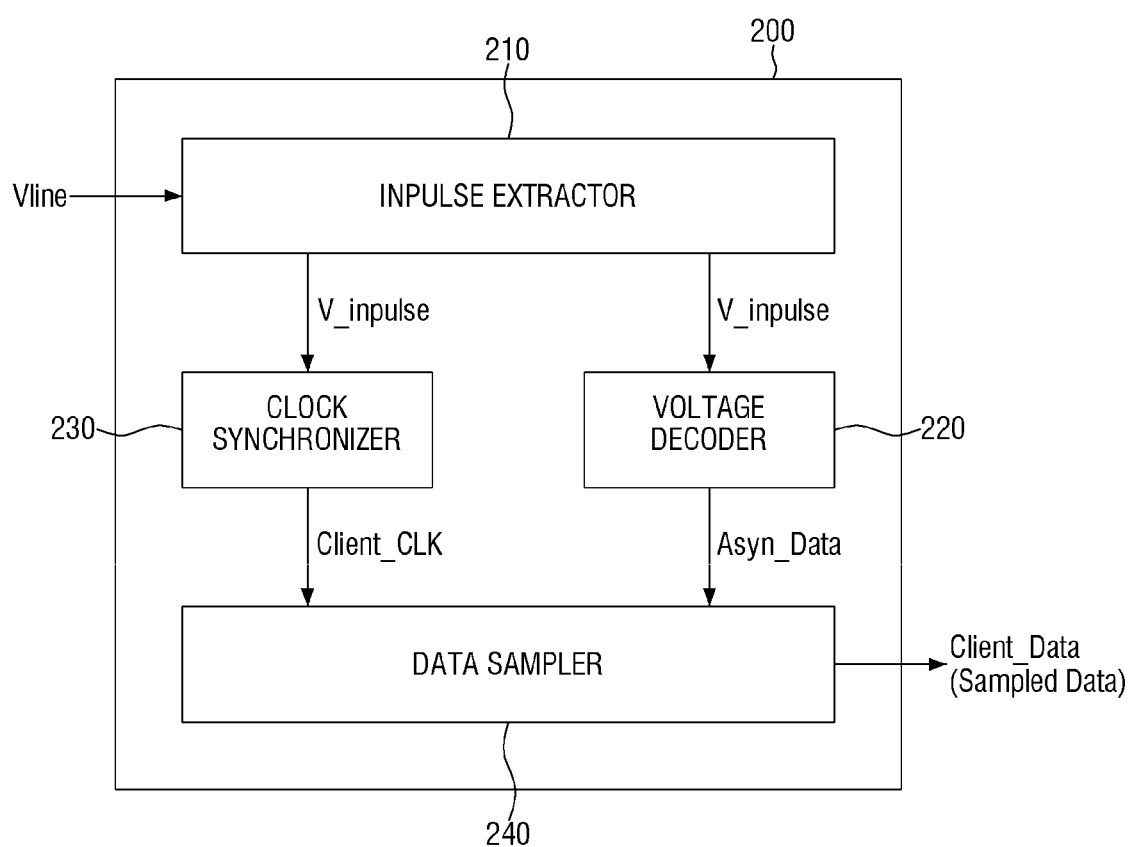
FIG. 15 is a block diagram of a digital receiving module according to an embodiment of the present disclosure.

FIG. 15 is a block diagram of a digital receiving module 200 according to an embodiment of the present disclosure.

Referring to FIG. 15, the digital receiving module 200 which receives a voltage pulse Vline and performs digital communication may include an inpulse extractor 210, a voltage decoder 220, a clock synchronizer 230, and a data sampler 240.

The inpulse extractor 210 extracts inpulse components Vrx from a voltage pulse Vline received from the digital transmitting module and generates an inpulse signal V_inpulse by referring to the inpulse components Vrx.

The voltage decoder 220 restores host digital data Host_Data received from the digital transmitting module 100 by referring to the inpulse signal V_inpulse generated by the inpulse extractor 210. The voltage decoder 220 provides the restored host digital data Host_data to the data sampler 240.

The clock synchronizer 230 generates a clock synchronization signal Syn_CLK for synchronization with a clock signal Host_CLK of the host device 10 by referring to an inpulse component Vrx existing in each cycle of the inpulse signal V_inpulse. The clock synchronizer 230 generates a client clock signal Clinet_CLK synchronized with the clock signal of the host device 10 by referring to the clock synchronization signal Syn_CLK. The clock synchronizer 230 may perform clock synchronization in the above order.

The data sampler 240 samples data for the client device 20 by referring to the client clock signal Client_CLK synchronized with the restored host digital data Host_Data and provides the sampling result (Sampled_data) to the data input terminal Client_Data of the client device 20.

Figure 16:
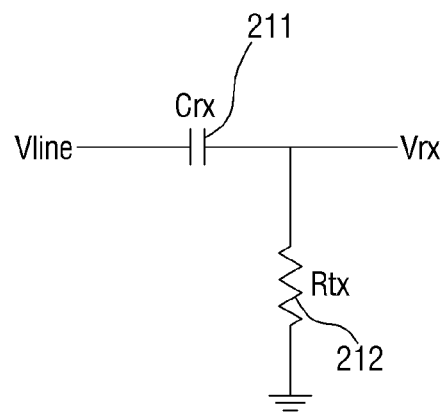
FIG. 16 is a circuit diagram illustrating an embodiment of elements that enable an inpulse extractor of FIG. 15 to extract an inpulse component.

FIG. 16 is a circuit diagram illustrating an embodiment of elements that enable the inpulse extractor 210 of FIG. 15 to extract an inpulse component.

Elements of the inpulse extractor 210 for extracting inpulse components from a voltage pulse Vline will be described with reference to FIG. 16. As described above, the present disclosure performs digital communication by referring to inpulse components Vrx existing in a voltage pulse Vline. Before performing digital communication, the inpulse extractor 210 extracts the inpulse components Vrx from the voltage pulse Vline and generates an inpulse signal V_inpulse composed only of pure inpulse components used for decoding and clock synchronization by referring to the inpulse components Vrx.

The digital receiving module 200 may extract inpulse components Vrx using various circuit techniques. Since the inpulse extractor 210 extracts high-frequency signals existing in a voltage pulse Vline, it can be implemented using various types of high-pass filters.

As an embodiment of the present disclosure, a method of extracting inpulse components using an alternating current (AC)-coupling technique is suggested. The circuit configuration of the inpulse extractor 210 using the AC-coupling technique is merely an example used to describe the present disclosure, and the present disclosure is not limited to this example. Any circuit configuration can be used to implement the inpulse extractor 200 as long as high-frequency components (inpulse components) can be obtained.

The AC-coupling technique is a circuit design technique for extracting only an AC signal component from a signal in which a DC signal and an AC signal coexist. Since a rising or falling edge of the voltage pulse Vline contains a high-frequency component, only the AC component can be extracted from the voltage pulse using the AC-coupling technique. The AC component is in the form of the inpulse component Vrx described above.

The AC-coupling circuit for extracting inpulse components Vrx can be simplified into a coupling condenser Crx (211) and a coupling resistor Rrx (212) as illustrated in FIG. 16. This is a simple form of high-pass filter. The illustrated circuit has a cut-off frequency of Fc=1/(2π×Rrx×Crx). In addition, the circuit has a time constant value of τ=Rrx×Crx.

If the host clock signal is sufficiently larger than the time constant τ, an output terminal of the AC-coupling circuit may extract an inpulse component Vrx by detecting a rising or falling edge of the voltage pulse Vline. This means that the cycle Host_CLK_T and frequency Host_CLK_F of the host clock signal Host_CLK should satisfy the following equation.

$$Host_{CLK_T} Y R_{rx} * C_{rx}$$

$$Host\_CLK\_FYF_c = 1/(2\pi sRrxSCrx) \quad (2).$$

Even in the sections from t1 to t1' and from t1' to t2 in which the voltage level of the voltage pulse Vline changes in the form of a ramp function, AC components exist because the voltage level of the voltage pulse Vline changes. If a frequency having a largest coefficient when a ramp function is Fourier-transformed is defined as F_ramp, the value of F_ramp should satisfy Fc>>F_Ramp. In this case, some AC components (inpulse components) may be detected due to the other coefficients of the Fourier transform, but may be ignored when the inpulse extractor 210 generates an inpulse signal V_inpulse.

A rise or fall in the voltage level of a voltage pulse according to a step function also appears as a rapid change (a rising edge or a falling edge). Therefore, an inpulse component due to the step function is shown in an inpulse component signal Vrx.

However, since the difference in voltage level between step functions is smaller than the difference between the first voltage level V1 and the second voltage level V2, inpulse components due to the step functions are small. The inpulse components due to the step functions may be ignored when the inpulse signal V_inpulse is generated.

Therefore, if each element value satisfies Equation (2), the inpulse extractor 220 can be implemented.

Figure 17:
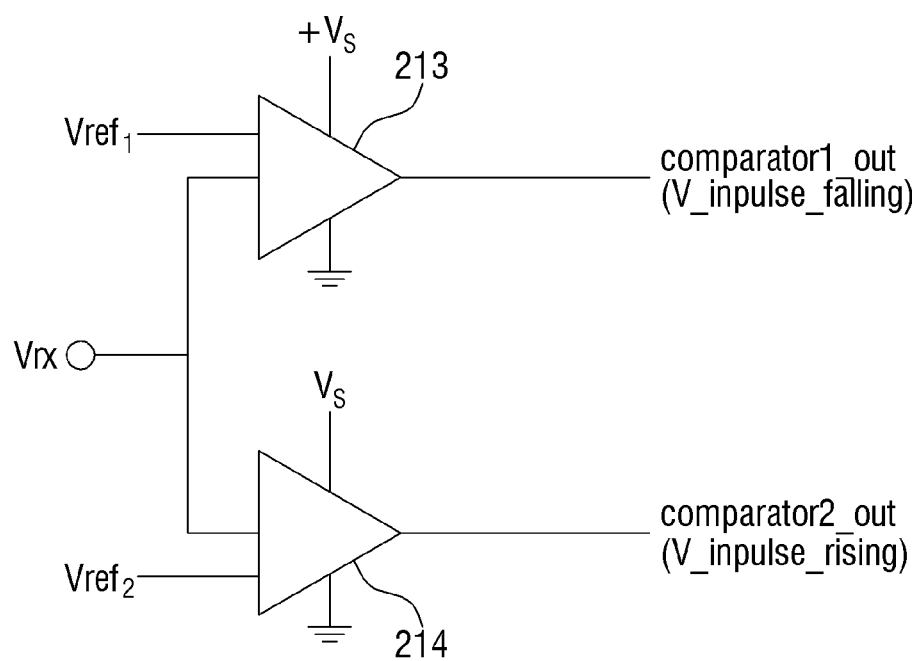
FIG. 17 is a circuit diagram illustrating elements that enable the inpulse extractor of FIG. 15 to generate an inpulse signal using inpulse components.

FIG. 17 is a circuit diagram illustrating elements that enable the inpulse extractor 210 of FIG. 15 to generate an inpulse signal Vinpulse using inpulse components Vrx.

An inpulse component signal Vrx may include not only an inpulse component due to a rising or falling edge of the voltage level of a voltage pulse Vline, but also a component due to the above-described ramp or step function signal and an inpulse component generated due to a non-ideal rising or falling edge. If the inpulse component signal Vrx is provided to the decoder 220 and the clock synchronizer as it is, an error may occur due to the above components. Therefore, elements for generating an inpulse signal V_inpulse composed of only pure inpulse components to be used for signal analysis are suggested.

A circuit of the inpulse extractor 210 for generating the inpulse signal V_inpulse will be described with reference to FIG. 17. The illustrated circuit is merely an example used to implement the inpulse extractor 210, and the present disclosure is not limited to the illustrated circuit. The inpulse extractor 210 can be configured in any form as long as it can generate the inpulse signal V_inpulse of the same form.

The inpulse extractor 210 may include two or more voltage comparators 213 and 214 as elements for generating the inpulse signal V_inpulse. Each of the voltage comparators may have two or more terminals. One of the two or more terminals may receive a reference voltage Vref, and the other terminal may receive a voltage to be compared with the reference voltage Vref. In the present disclosure, an extracted inpulse component signal Vrx may be applied to one of the two terminals of each of the voltage comparators.

Each of the voltage comparators 213 and 214 compares voltage levels received through its two terminals and outputs a predetermined value of +Vs when the voltage level of the reference voltage Vref is lower than that of the inpulse component signal Vrx and outputs a predetermined value of 0 V when the voltage level of the reference voltage Vref is higher than that of the inpulse component signal Vrx.

To configure the voltage comparators 213 and 214, the inpulse extractor 210 may include one or more Op-amps. An Op-amp is typically used to amplify a signal, but, in a certain circuit, may serve as a voltage comparator for comparing the magnitudes of voltages. The detailed circuit configuration of a voltage comparator including an Op_amp can be found at http://cherryopatra.tistory.com/139.

Generally, a signal extracted from another signal may not be suitable for use in signal detection because it is small in magnitude. Thus, the inpulse component signal Vrx may be applied to a gain amplifier (not illustrated) before being applied to the voltage comparators 213 and 214. The inpulse component signal Vrx that passes through the gain amplifier is used to generate the inpulse signal V_inpulse.

If two or more voltage comparators 213 and 214 are used, two or more output signals are obtained. Each of the output signals is used to distinguish digital bits 0 and 1. Specifically, an output of the comparator 213 for detecting a rising edge of the voltage level of the voltage pulse Vline is defined as V_inpulse_falling(comparator1_out). An output of the comparator 214 for detecting a falling edge of the voltage level of the voltage pulse Vline is defined as V_inpulse_rising)(comparator2_out).

The outputs are signals for detecting a falling edge and a rising edge of a digital signal, respectively.

The inpulse signal V_inpulse may be divided into an input signal V_inpulse_falling having a negative component and an inpulse signal V_inpulse_low having a positive component as described above. However, this method of dividing the inpulse signal V_inpulse is merely an example, and the present disclosure is not limited to this example.

For example, the inpulse signal V_inpulse may be implemented as a single signal having a voltage level of +Vs when a positive inpulse component is detected using a circuit in a form different from that of the above circuit and having a voltage level of −Vs when a negative inpulse component is detected.

Figure 18A:
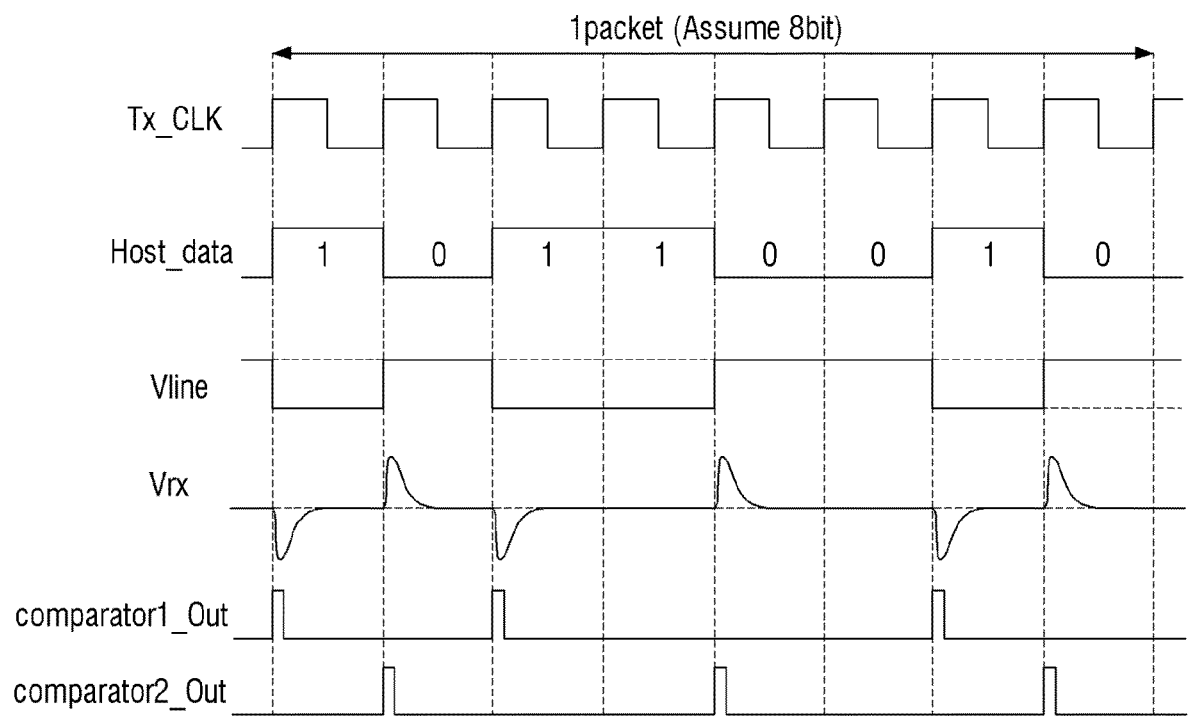
FIG. 18A is a timing diagram for explaining an embodiment in which the inpulse extractor generates an inpulse signal using inpulse components.
Figure 18B:
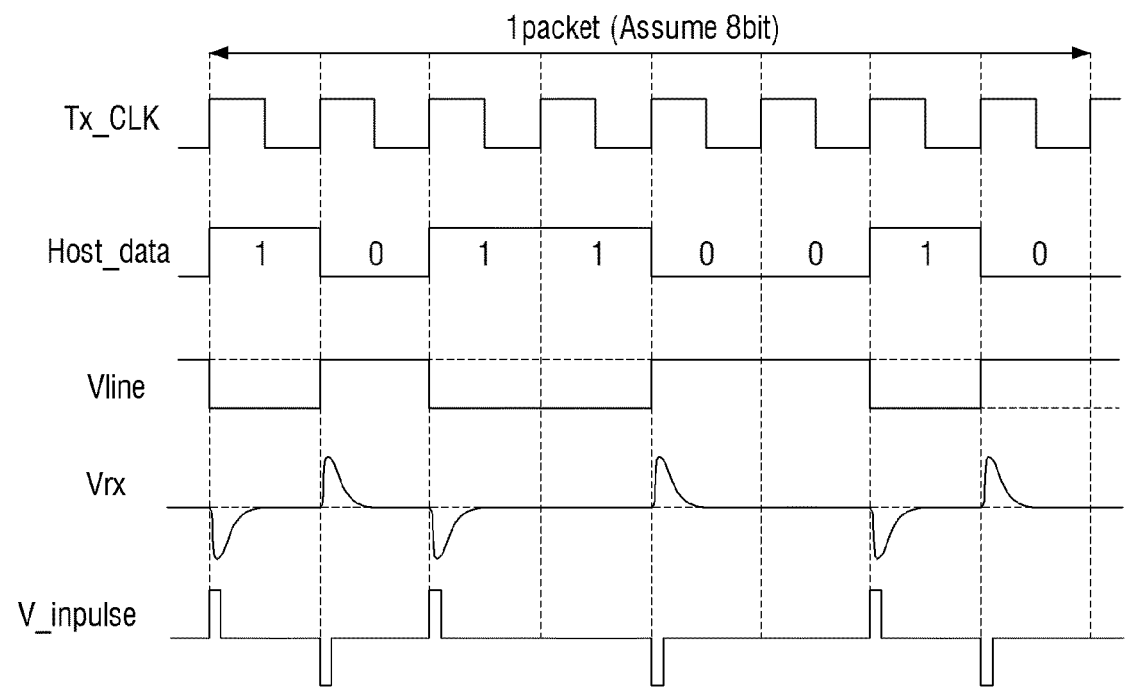
FIG. 18B is a timing diagram for explaining another embodiment in which the inpulse extractor generates an inpulse signal using inpulse components.

FIG. 18A is a timing diagram for explaining an embodiment in which the inpulse extractor 210 generates an inpulse signal V_inpulse using inpulse components Vrx. FIG. 18B is a timing diagram for explaining another embodiment in which the inpulse extractor 210 generates an inpulse signal V_inpulse using inpulse components Vrx.

A method by which the inpulse extractor 210 generates V_inpuse_falling(comparator1_out) and V_inpulse_rising (comparator2_out) will be described with reference to FIG. 18A. It is assumed that the digital transmitting module 100 transmits host digital data "10110010" as in the above example.

When a value of "1" is input as a digital bit, a falling edge occurs in the voltage level of a voltage pulse Vline. In this case, an inpulse component signal Vrx outputs a negative inpulse component and then slowly returns to a bias voltage as illustrated in the drawing.

When a value of "0" is input as a digital bit, a rising edge occurs in the voltage level of the voltage pulse Vline. In this case, the inpulse component signal Vrx extracts a positive inpulse component and then slowly returns to the bias voltage.

The voltage comparator 213 which generates the inpulse signal comparator1_out having the negative component receives Vref1 as a comparator voltage value. The voltage comparator 213 outputs 0 V when the voltage level of the inpulse component signal is higher than Vref1 and outputs+Vs when the voltage level of the inpulse component signal is lower than Vref1.

The voltage comparator 214 which generates the inpulse signal comparator2_out having the positive component receives Vref2 as a comparator voltage value. The voltage comparator 214 outputs+Vs when the voltage level of the inpulse component signal is higher than Vref2 and outputs+Vs when the voltage level of the inpulse component signal is lower than Vref2.

Referring to the bottom of the timing diagram of FIG. 18A, a signal is detected in comparator1_out when a falling edge occurs in the voltage pulse Vline. This means that the digital bit has changed from 0 to 1. In addition, a signal is detected in comparator2_out when a rising edge occurs in the voltage pulse Vline. This means that the digital bit has changed from 1 to 0.

The result of generating an inpulse signal V_inpulse as a single signal using the inpulse extractor 210 will be described with reference to FIG. 18B. The inpulse signal V_inpulse illustrated in FIG. 18B is different from the inpulse signals comparator1_out and comparator2_out illustrated in FIG. 18A in that it is output as a single signal.

Referring to the bottom of the timing diagram of FIG. 18B, a +Vs signal is detected in V_inpulse when a falling edge occurs in the voltage pulse Vline. This means that the digital bit has changed from 0 to 1. In addition, a −Vs signal is detected in the V_inpulse when a rising edge occurs in the voltage pulse Vline. This means that the digital bit has changed from 1 to 0. If the above method is used, the circuit configuration may become complicated. However, the inpulse extractor 210 can transmit the inpulse signal V_inpulse as a single signal to the voltage decoder 220 and the clock synchronizer 230.

Figure 19A:
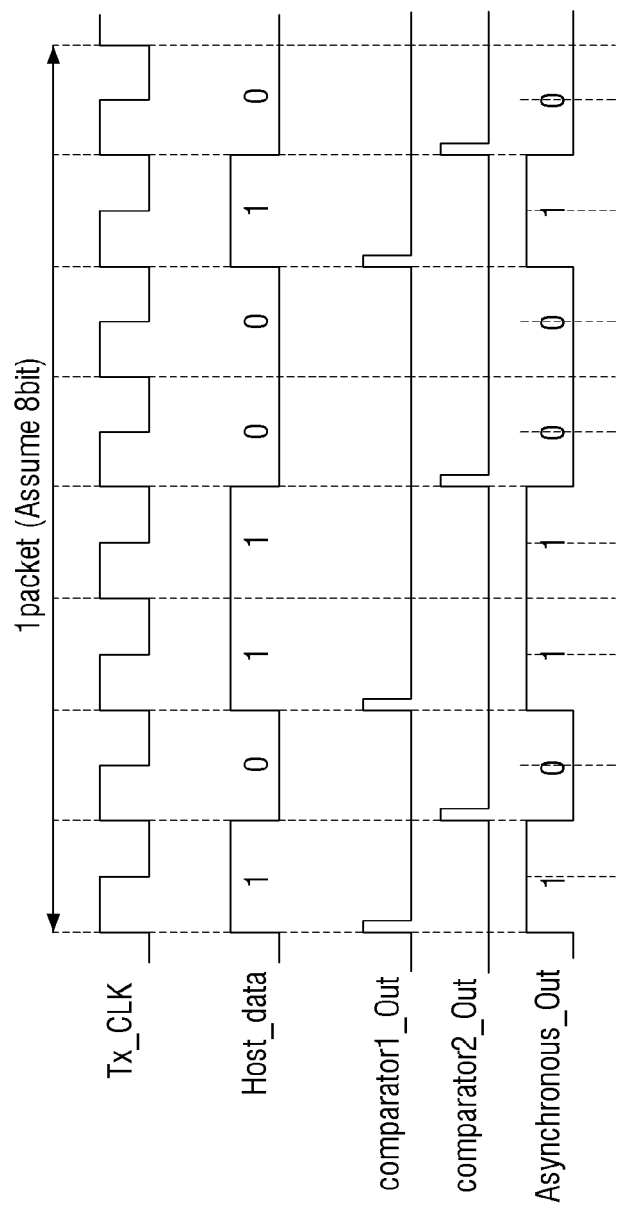
FIG. 19A is a timing diagram for explaining a method by which a voltage decoder decodes digital bits using an inpulse signal.
Figure 19B:
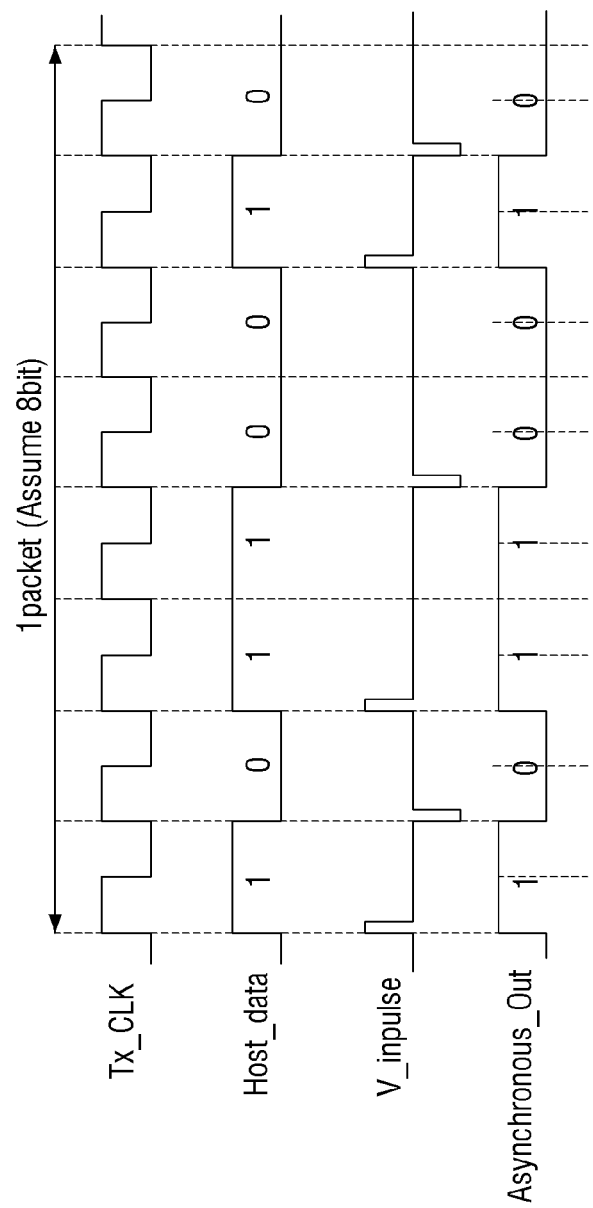
FIG. 19B is a timing diagram for explaining another method by which the voltage decoder decodes digital bits using an inpulse signal.

FIG. 19A is a timing diagram for explaining a method by which the voltage decoder 220 decodes digital bits using an inpulse signal V_inpulse. FIG. 19B is a timing diagram for explaining another method by which the voltage decoder 220 decodes digital bits using an inpulse signal V_inpulse.

A method by which the voltage decoder 220 decodes host digital data Host_Data when an inpulse signal V_inpulse is provided to the voltage decoder 220 in the form of FIG. 18A will be described with reference to FIG. 19A.

The voltage decoder 220 decodes the host data Host_Data received from the digital transmitting module 110 by referring to V_inpulse_falling(comparator1_out) and V_inpulse_rising(comparator2_out).

Specifically, when +Vs is input as the voltage level of comparator1_out, the voltage decoder 220 determines that an input value has changed from 0 to 1 by referring to a digital bit of a previous cycle. In addition, when +Vs is input as the voltage level of comparator2_out, the voltage decoder 220 determines that the input value has changed from 1 to 0 by referring to the digital bit of the previous cycle.

When there is no change in the value of the digital bit, the voltage levels of comparator1_out and comparator2_out may all be maintained at a reference level. In this case, the voltage decoder 220 determines that the same digital bit as the digital bit of the previous cycle has been received.

A method by which the voltage decoder 220 decodes the host digital data Host_Data when the inpulse signal V_inpulse is provided to the voltage decoder 220 in the form of FIG. 18B will be described with reference to FIG. 19B.

The voltage decoder 220 decodes the host data Host_Data received from the digital transmitting module 100 by referring to the inpulse signal V_inpulse input as a single signal.

Specifically, when +Vs is input as the voltage level of V_inpulse, the voltage decoder 220 determines that the input value has changed from 0 to 1 by referring to the digital bit of the previous cycle. In addition, when −Vs is input as the voltage level of V_inpulse, the voltage decoder 220 determines that the input value has changed from 1 to 0 by referring to the digital bit of the previous cycle. When there is no change in the value of the digital bit, the voltage level of Vinpulse may be maintained at the reference voltage level. In this case, the voltage decoder 220 determines that the same digital bit as the digital bit of the previous cycle has been received by referring to the digital bit of the previous cycle.

The embodiment in which a voltage pulse Vline constantly outputs a high value when the digital bit changes from 0 to 1 and outputs a low value when the digital bit changes from 1 to 0 has been described with reference to FIGS. 17 through 19.

When this matching method is used, host digital data can be restored using the sign of an inpulse component without any problem. However, if the same bits are successively provided to the inpulse extractor 210, there may be a cycle in which no inpulse component Vrx is detected.

Therefore, the digital bit encoding method of FIG. 9 is used so that the voltage pulse Vline can output an inpulse component Vrx every cycle regardless of direction as described above. Since a response in the form of a ramp function is not detected in an inpulse response, the inpulse extractor 210 may generate the inpulse component Vrx every cycle.

If the encoding method of FIG. 9 is used, the voltage decoder 220 receives a different form of inpulse signal V_inpulse according to a digital bit in each cycle. Therefore, there is no need to decode the host digital data Host_Data using the change of the digital bit.

A case where the voltage decode 220 decodes digital data using V_inpulse_falling(comparator1_out) and V_inpulse_rising)(comparator2_out) will be described.

The voltage decoder 220 may determine that a digital bit of 0 has been received when the voltage level of V_inpulse_falling has a value of +Vs. The voltage decoder 220 may determine that a digital bit of 1 has been received when +Vs is applied as the voltage level of V_inpulse_rising.

A case where the voltage decoder 220 decodes digital data using a single inpulse signal V_inpulse will be described.

The voltage decoder 220 may determine that a digital bit of 0 has been received when the voltage level of V_inpulse has a value of +Vs. The voltage decoder 220 may determine that a digital bit of 1 has been received when −Vs is applied as the voltage level of V_inpulse_rising.

The method of matching digital bits, voltage pulses Vline, and inpulse signals V_inpulse of the digital transmitting module 100 and the digital receiving module 200 is not limited to the above description.

Figure 20A:
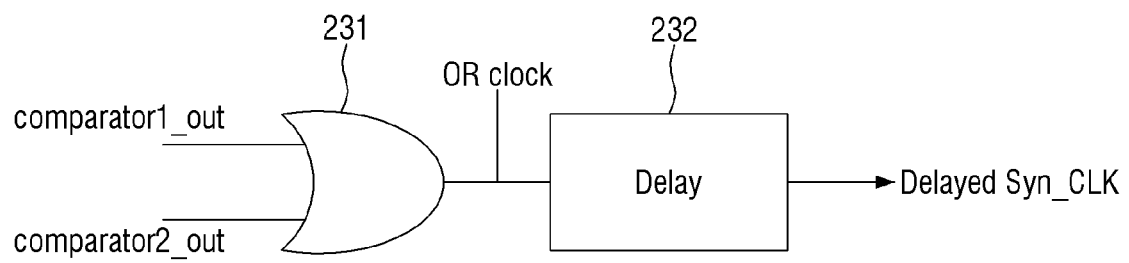
FIG. 20A is a circuit diagram of a clock synchronizer of FIG. 15 which generates a synchronization signal Syn_CLK using an inpulse signal and performs synchronization with a client clock.
Figure 20B:
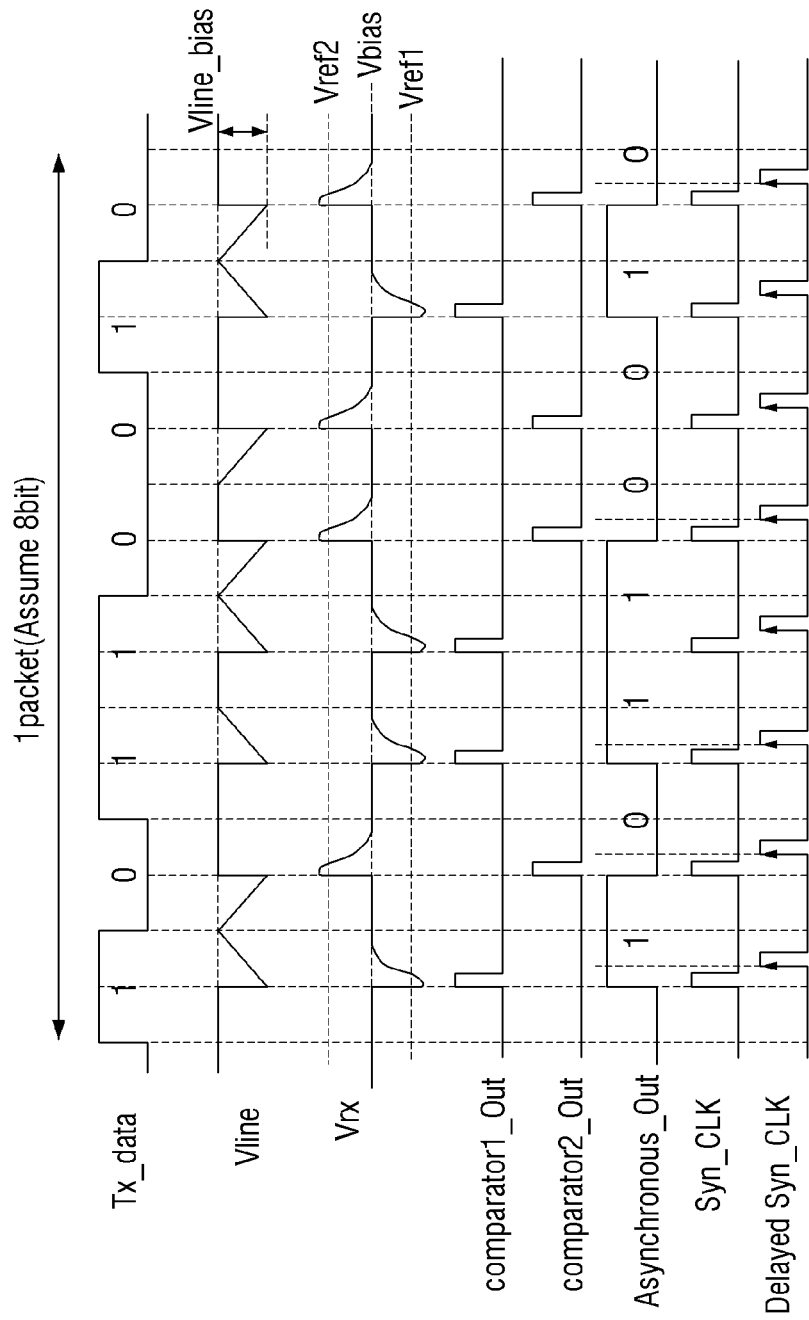
FIG. 20B is a timing diagram of the clock synchronization signal Syn_CLK generated according to FIG. 20A.

FIG. 20A is a circuit diagram of the clock synchronizer 230 of FIG. 15 which generates a synchronization signal Syn_CLK using an inpulse signal V_inpulse and performs synchronization by generating a client clock Client_CLK synchronized with a host clock Host_CLK. FIG. 20B is a timing diagram of the clock synchronization signal Syn_CLK generated according to FIG. 20A.

The clock synchronizer 230 generates a synchronization signal Syn_CLK for synchronizing the host device 10 and the client device 20 by referring to an inpulse component existing in each cycle of an inpulse signal V_inpulse received from the inpulse extractor 210 and synchronizes a client clock signal Client_CLK according to the synchronization signal.

If host digital data is decoded using only inpulse components as described above, a host digital data signal can be restored, but the jitter problem may occur in the process of sampling the host digital data signal.

However, the jitter problem can be solved by generating the synchronization signal Syn_CLK using the inpulse signal V_inpulse and synchronizing the client clock Client_CLK using the synchronization signal Syn_CLK.

The clock synchronizer 230 may include at least one OR gate 231 for generating the synchronization signal Syn_CLK and at least one delay element 232.

A method by which the clock synchronizer 230 generates the clock synchronization signal Syn_CLK when the inpulse signal V_inpulse is provided to the clock synchronizer 230 according to the embodiment of FIG. 18A will be described with reference to FIG. 20A.

When the clock synchronizer 230 receives the inpulse signal V_inpulse in the form of V_inpulse_falling (comparator1_out) and V_inpulse_rising)(comparator2_out), it may combine the two signals. In this case, the clock synchronizer 230 combines the two signals using the OR gate 231. The clock synchronization signal Syn_CLK is generated according to the OR gate 231.

In a typical digital communication system, if data sampling is performed using a clock synchronization signal immediately after the clock synchronization signal is extracted, the overall synchronization may be out of phase due to the operation speed of a data log for decoding digital data. To solve this problem, the clock synchronizer 230 may include the delay unit 232 for delaying the clock synchronization signal Syn_CLK.

The clock synchronizer 230 may provide the clock synchronization signal Syn_CLK to the delay unit 232 to obtain a delayed clock synchronization signal Delayed_Syn_CLK.

A method by which the clock synchronizer 230 generates the clock synchronization signal Syn_CLK will be described in detail with reference to FIG. 20B. Comparing the timing diagram of FIG. 18A with the timing diagram of FIG. 20B, it can be seen that no voltage level is detected between third and fourth successive bits of 1 and between fifth and sixth successive bits of 0 in both comparator1_out and comparator2_out.

On the other hand, referring to the timing diagram of FIG. 20 utilizing the encoding method of FIG. 9, it can be seen that a voltage level is detected even between the third and fourth bits and between the fifth and sixth bits in comparator1_out and comparator2_out.

The clock synchronizer 230 generates the clock synchronization signal Syn_CLK shown at the bottom of the drawing through an OR operation on inpulse_falling(comparator Lout) and V_inpulse_rising)(comparator2_out). The clock synchronizer 230 applies Syn_CLK to the delay unit to generate the final delayed clock synchronization signal Delayed_Syn_CLK.

The clock synchronizer provides the delayed clock synchronization signal Delayed_Syn_CLK shown at the bottom of the drawing to the data sampler.

Figure 20C:
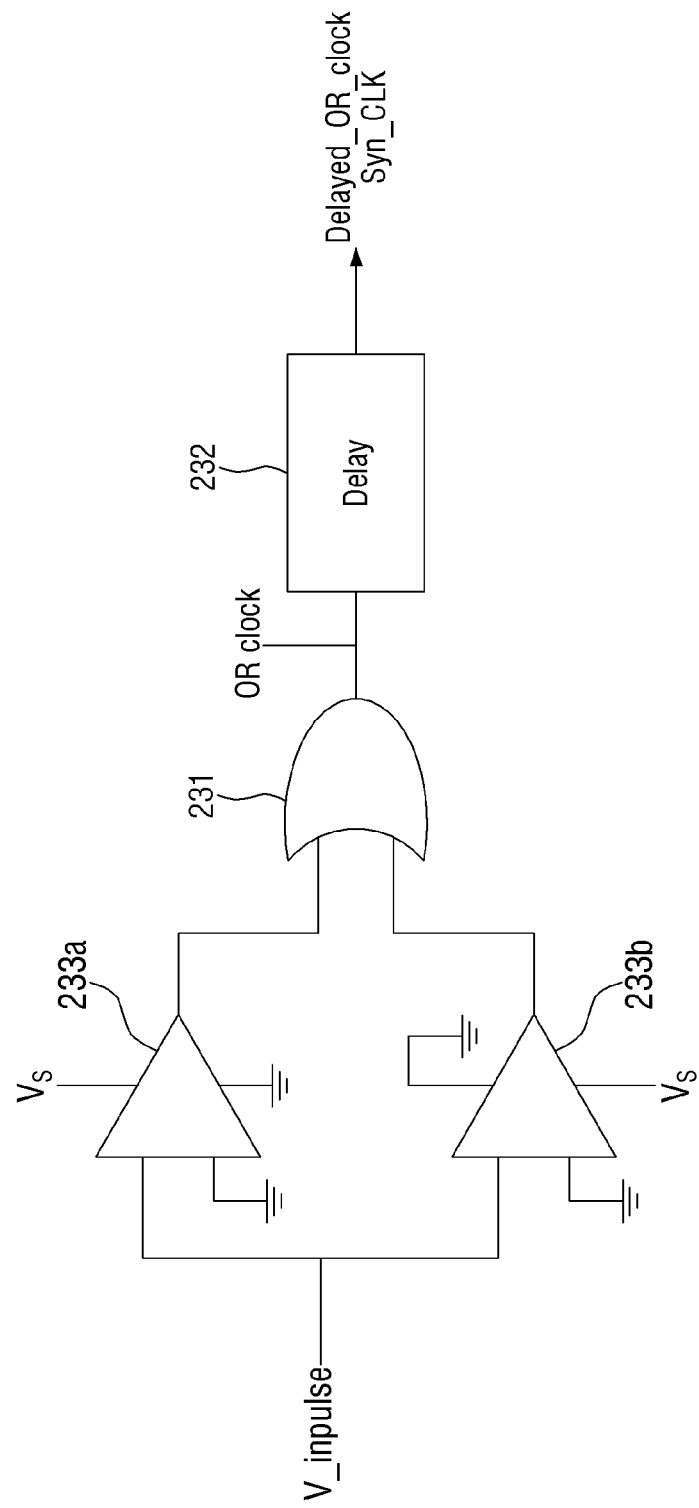
FIG. 20C is another circuit diagram of the clock synchronizer 230 which generates a synchronization signal using an inpulse signal and performs synchronization with a client clock.

FIG. 20C is another circuit diagram of the clock synchronizer 230 which generates a synchronization signal Syn_CLK using an inpulse signal V_inpulse and performs synchronization with a client clock Client_CLK.

A method by which the clock synchronizer 230 generates a synchronization signal Syn_CLK and provides the synchronization signal Syn_CLK to the data sampler 240 when an inpulse signal V_inpulse is provided to the clock synchronizer 230 according to the embodiment of FIG. 18B will be described with reference to FIG. 20C.

To generate a clock synchronization signal using a single inpulse signal V_inpulse, the clock synchronizer 230 may include a plurality of voltage comparators 233a and 233b for dividing the inpulse signal.

Each of the voltage comparators 233a and 233b checks whether the voltage level of the inpulse signal V_inpulse exceeds a reference level. In the current embodiment, the reference level may be 0 V.

The voltage comparator 233a for extracting a positive inpulse component determines whether the voltage level of the inpulse signal V_inpulse exceeds the reference level and outputs+Vs when receiving a value exceeding the reference level and outputs 0 V in other cases.

The voltage comparator 233b for extracting a negative inpulse component determines whether the voltage level of the inpulse signal V_inpulse is lower than the reference level and outputs+Vs when receiving a value smaller than the reference level and outputs 0 V in other cases.

The clock synchronizer 230 may obtain the clock synchronization signal Syn_CLK by applying the outputs of the voltage comparators 233a and 233b to an OR gate. The subsequent control is the same as described above and thus will not be described again. The clock synchronization signal Syn_CLK and the delayed clock signal Syn_CLK are the same as those illustrated in FIG. 20B.

The circuit diagram of the clock synchronizer 230 is not limited to the above description. The clock synchronizer 230 can be implemented in any form as long as it can generate a clock synchronization signal by referring to inpulse components of the inpulse signal V_inpulse.

Figure 21:
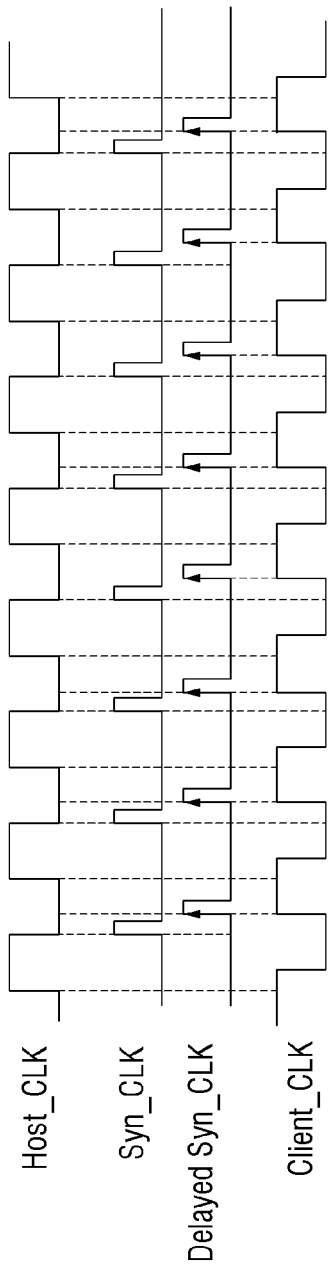
FIG. 21 is a timing diagram for explaining a method by which the clock synchronizer generates a client clock signal using a clock synchronization signal.

FIG. 21 is a timing diagram for explaining a method by which the clock synchronizer 230 generates a client clock signal Client_CLK using a clock synchronization signal.

The clock synchronizer 230 generates a client clock signal Host_CLK by referring to a delayed clock synchronization signal Delayed_Syn_CLK. The clock synchronizer 230 may generate a synchronized client clock signal using a rising edge or a falling edge existing in a clock synchronization signal Syn_CLK.

In FIG. 21, a host clock signal Host_CLK, the delayed clock synchronization signal Delayed_Syn_CLK, and the generated client clock signal Client_CLK are illustrated. Comparing the host clock signal Host_CLK and the client clock signal Client_CLK, it can be seen that the client clock signal Client_CLK is delayed compared with the host clock signal Host_CLK according to the synchronization logic. However, this is not a problem because synchronization is to match frequencies and a delay will occur in the process of restoring host digital data Host_Data using the voltage decoder 220.

If the voltage pulse Vline is encoded according to the encoding method of FIG. 9 as described above, it is possible to restore digital data and synchronize the host device and the client device using a single power line. Thus, there is no need for a circuit designer to install a power line for a synchronization signal.

Figure 22:
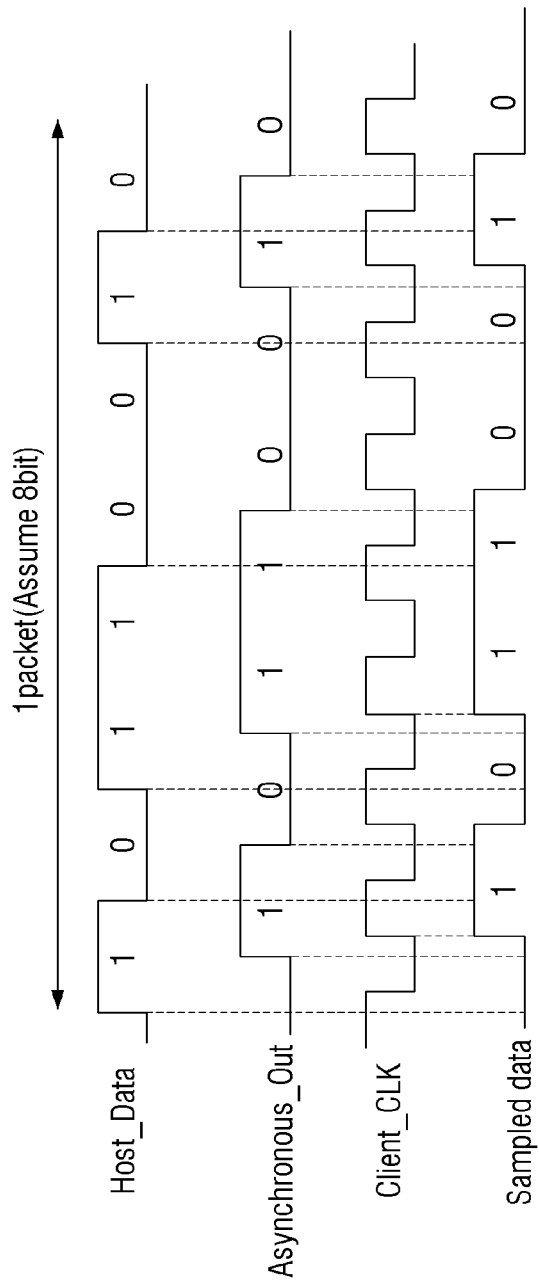
FIG. 22 is a timing diagram for explaining a method by which a data sampler 240 of FIG. 15 outputs sampled data.

FIG. 22 is a timing diagram for explaining a method by which the data sampler 240 of FIG. 15 outputs sampled data.

A method by which the data sampler 240 generates final client data Client_Data by sampling restored asynchronous host digital data Asynchronous_out will be described with reference to FIG. 22. The original host digital data Host_Data transmitted from the digital transmitting module 100, the asynchronous host digital data Asynchronous_out restored by the voltage decoder 230, a client clock signal Client_CLK generated by the clock synchronizer 230, and final sampled data Sampled_data are illustrated in FIG. 21.

When sampling is performed using an undelayed clock synchronization signal Syn_CLK, there is a risk of a sampling error because the operation time of a synchronization signal generating logic of the clock synchronizer 230 is similar to the operation time of a host data restoring logic of the voltage decoder 220. To solve this problem, the client clock signal Client_CLK generated according to a delayed clock synchronization signal is used.

The data sampler 240 samples the restored asynchronous host digital data Asynchronous_out at a rising edge of the client clock signal Client_CLK. The final client signal Sampled_Data sampled according to the client clock signal is illustrated at the bottom of FIG. 22. If this is compared with the host digital data Host_Data, it can be seen that the digital receiving module 200 properly receives and provides the client digital data Client_Data to the client device. Further, the above-described jitter problem does not occur.

The method by which the data sampler 240 samples the client data from the asynchronous host digital data Asynchronous_out is not limited to the above description. A method of performing data sampling using a falling edge of the client clock or a method of obtaining the final client data Client_Data using various sampling techniques known to those of ordinary skill in the art can be included as an embodiment of the present disclosure.

Figure 23:
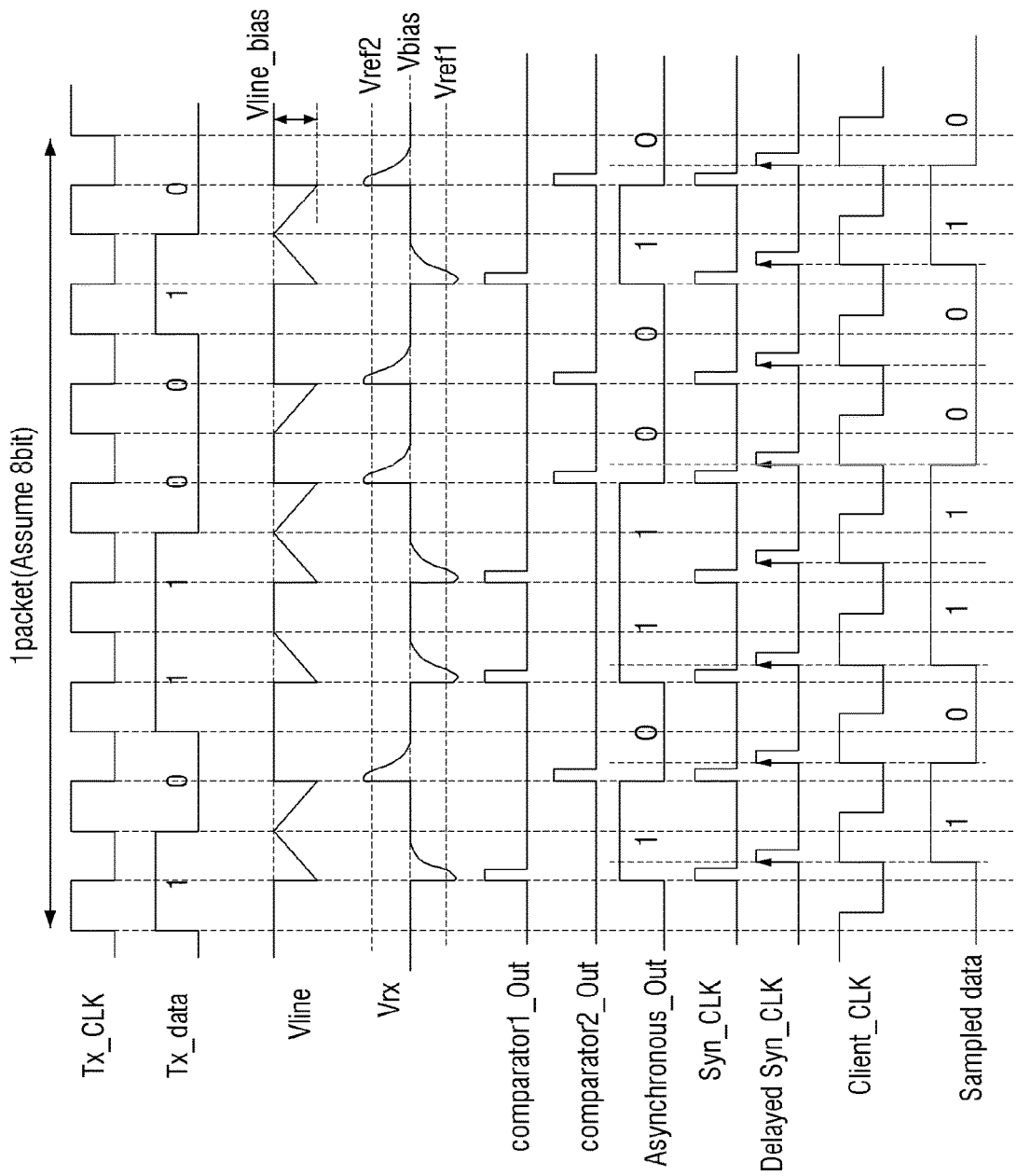
FIG. 23 is a timing diagram for explaining a method by which the digital transmitting module and the digital receiving module perform asynchronous serial communication according to some embodiments of the present disclosure.

FIG. 23 is a timing diagram for explaining a method by which the digital transmitting module 100 and the digital receiving module 200 perform asynchronous serial communication according to some embodiments of the present disclosure.

The method by which the digital transmitting module 100 and the digital receiving module 200 perform asynchronous serial communication at the transmitting end Tx and the receiving end Rx will be described in detail with reference to FIG. 23. Until now, a case where the host device 10 includes the digital transmitting module 100 and the client device 20 includes the digital receiving module 200 so that digital data is transmitted from the host device 10 to the client device 20 has been described as an example.

However, the present disclosure is not limited to the case where the digital transmitting module 100 is included in the host device 10 and the digital receiving module 200 is included in the client device 20.

In a digital communication system, the client device 20 may also transmit digital data to the host device 10 in many cases. In FIG. 23, the digital transmitting module 100 is provided at the transmitting end Tx, and the digital receiving module 200 is provided at the receiving end Rx. The transmitting end Tx may be the host device 10 or the client device 20. The receiving end Rx may be the client 20 when the transmitting end Tx is the host device 10 and may be the host device 10 when the transmitting end Tx is the client device 20.

The digital transmitting module 100 may receive transmission digital data Tx_data and a transmission clock signal Tx_CLK from the transmitting end Tx. The digital transmitting module 100 encodes a voltage pulse Vline by referring to the transmission clock signal Tx_CLK. The voltage pulse Vline may be encoded in a ramp form to gradually fall or rise after a rising edge or a falling edge.

A method by which the digital transmitting module 100 encodes the voltage pulse Vline is the same as the above-described method by which the voltage encoder 120 encodes host digital data into a voltage pulse Vline, and thus its description is omitted. The digital transmitting module 200 transmits the generated voltage pulse Vline to the receiving end Rx.

The digital receiving module 200 provided at the receiving end Rx may receive the voltage pulse Vline from the transmitting end Tx. The digital receiving module 200 receives the voltage pulse and extracts an inpulse component signal Vrx from the voltage pulse. Then, the digital receiving module 200 generates inpulse signals comparator1_out and comparator2_out containing only inpulse components by referring to the inpulse component signal Vrx. In FIG. 23, a negative inpulse component signal comparator1_out and a positive inpulse component signal comparator2_out generated as described in FIG. 18A are illustrated. A method by which the digital receiving module 200 extracts inpulse components and generates an inpulse signal by referring to the extracted inpulse components is the same as the above-described method by which the inpulse extractor 210 generates an inpulse signal V_inpulse, and thus its description is omitted.

The digital receiving module 200 may decode the voltage pulse Vline and restore an asynchronous transmission digital data signal Asynchronous_out by referring to the inpulse signals comparator1_out and comparator2_out. A method by which the digital receiving module 200 decodes the voltage pulse Vline and restores the asynchronous transmission digital data signal Asynchronous_out is the same as the above-described method by which the voltage decoder 220 restores asynchronous host digital data, and thus its description is omitted.

The digital receiving module 200 may generate a clock synchronization signal Syn_CLK and a delayed clock synchronization signal Delayed_Syn_CLK by referring to the inpulse signals comparator1_out and comparator2_out. A method by which the digital receiving module 200 generates the clock synchronization signal Syn_CLK and the delayed clock synchronization signal Delayed_Syn_CLK is the same as the above-described method by which the clock synchronizer 230 generates a clock synchronization signal Syn_CLK and a delayed clock synchronization signal Delayed_Syn_CLK, and thus its description is omitted.

The digital receiving module 200 may generate a reception clock signal Rx_CLK used in a digital data process of the receiving end Rx by referring to the clock synchronization signal Syn_CLK or the delayed clock synchronization signal Delayed_Syn_CLK. A method by which the digital receiving module 200 generates the reception clock signal Rx_CLK is the same as the above-described method by which the clock synchronizer 230 generates a client clock signal Client_CLK, and thus its description is omitted.

The digital receiving module 200 may sample reception digital data Rx_data finally provided to the receiving end Rx by using the reception clock signal Rx_CLK. A method by which the digital receiving module 200 samples the reception digital data is the same as the above-described method by which the data sampler 240 samples client digital data, and thus its description is omitted.

Figure 24:
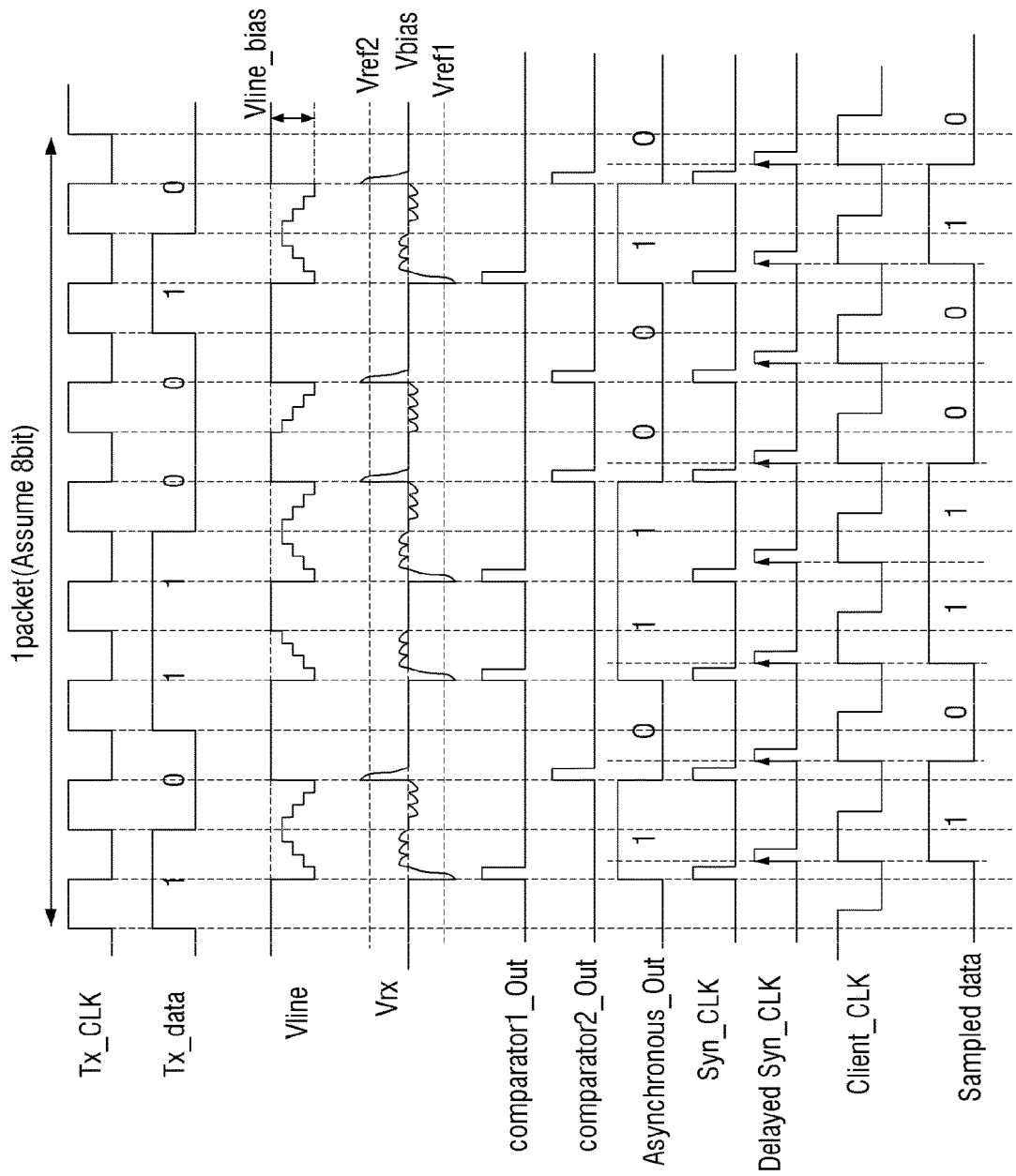
FIG. 24 is a timing diagram for explaining another method by which the digital transmitting module and the digital receiving module perform asynchronous serial communication according to some other embodiments of the present disclosure.

FIG. 24 is a timing diagram for explaining a method by which the digital transmitting module 100 and the digital receiving module 200 perform asynchronous serial communication according to some other embodiments of the present disclosure.

Another embodiment in which the digital transmitting module 100 and the digital receiving module 200 perform asynchronous serial communication at the transmitting end Tx and the receiving end Rx will be described in detail with reference to FIG. 24. The timing diagram of FIG. 24 is different from the timing diagram of FIG. 23 in that the digital transmitting module 100 encodes transmission digital data Tx_data into a voltage pulse Vline that gradually falls or rises in the form of a plurality of step functions after a rising edge or a falling edge.

A method of encoding the transmission digital data Tx_data into the voltage pulse Vline whose voltage level gradually falls or rises in the form of a plurality of step functions after a rising edge or a falling edge is the same as the above-described method by which the voltage encoder 120 encodes a voltage pulse Vline including step functions, and thus its description is omitted.

In this case, circuit implementation is simpler than the embodiment of FIG. 23, and digital data can be transmitted more efficiently.

According to some embodiments of the present disclosure, the transmitting end Tx may encode the transmission digital data Tx_data and a transmission clock signal Tx_CLK into the voltage pulse Vline flowing through the single power line 30 by using the digital transmitting module 100.

The receiving end Rx may decode the voltage pulse Vline using the digital receiving module 200, obtain a reception clock signal Rx_CLK synchronized with the transmission clock signal Tx_CLK, and sample reception digital data Rx_data by referring to the reception clock signal Rx_CLK.

The asynchronous serial communication between the transmitting end Tx and the receiving end Rx can be performed using the digital transmitting module 100 and the digital receiving module 200.

Figure 25A:
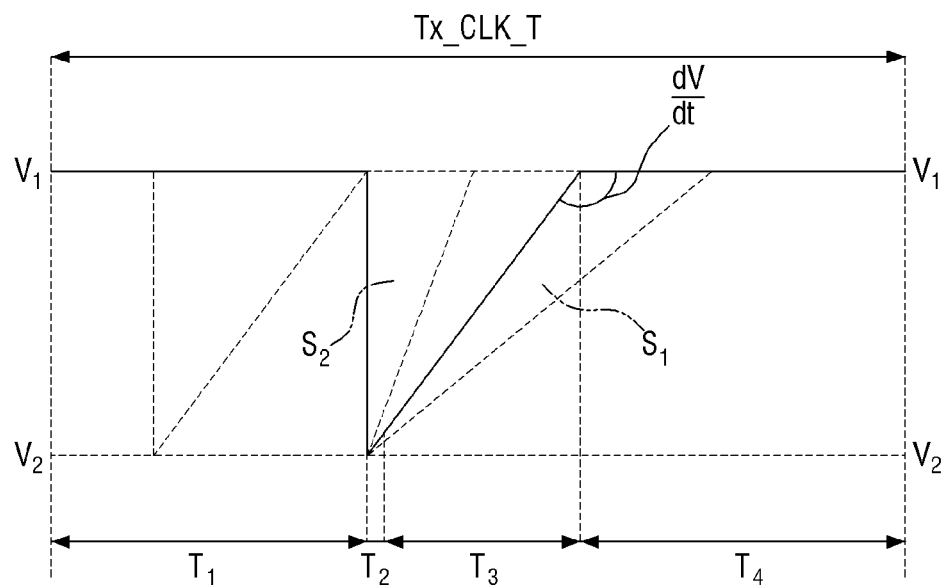
FIG. 25A is a timing diagram for explaining a method by which a signal modulator controls the encoding form of a voltage pulse.

FIG. 25A is a timing diagram for explaining a method by which the signal modulator 130 of FIG. 3 controls the encoding form of a voltage pulse Vline.

Error rate and power consumption are important criteria for judging the performance of a digital communication system. As described above, the present disclosure can reduce power consumption as compared with Manchester code that transmits digital data using a rising or falling edge of a signal.

In digital communication, power consumption is proportional to the square of the voltage level of a voltage pulse Vline as described above. Therefore, the area of the voltage pulse Vline into which digital bits are encoded is a criterion for calculating the power consumption of the digital communication system.

A method by which the signal modulator 130 controls the form of the voltage pulse Vline when digital bits are encoded according to the embodiment of FIG. 9 will be described with reference to FIG. 25A. The signal modulator 130 may control the form of the voltage pulse Vline by adjusting the lengths of T1 through T4 in the digital encoding method according to the embodiment of FIGS. 10A and 10B.

By adjusting the duration of T1, the signal modulator 130 may change the time when the voltage level of the voltage pulse Vline changes according to the generation of a clock signal Tx_CLK. According to the embodiment of FIG. 10A, as the value of T1 becomes close to 0, the voltage level of the voltage pulse Vline rapidly changes with the generation of the clock signal Tx_CLK.

On the other hand, according to the embodiment of FIG. 10B, as the value of T1 becomes close to 0, the voltage level of the voltage pulse Vline gradually changes (ramp) with the generation of the clock signal Tx_CLK.

When the signal modulator 130 determines the value of T1 to be close to 0, a delay due to the operation logics of the digital transmitting module 100 and the digital receiving module 200 may not occur. However, since the voltage level of the voltage pulse Vline should change with the generation of the clock signal, signal stability may be reduced.

The signal modulator 130 may determine the time when a rapid change (a rising or falling edge) of the voltage level of the voltage pulse Vline occurs by adjusting the duration of T2 illustrated in FIG. 10A or the duration of T3 illustrated in FIG. 10B. Ideally, a rapid level change should occur for a period of 0. However, in actual circuit implementation, it is impossible to shift the voltage level of the voltage pulse Vline from the first voltage level V1 to the second voltage level V2 for the period of 0. Therefore, the signal modulator 130 controls the voltage pulse Vline to be encoded as ideally as possible by adjusting the duration of T2 or T3.

When the duration of T2 or T3 becomes close to 0, the circuit may operate ideally, and the digital receiving module 200 may better extract inpulse components from the voltage pulse Vline.

The signal modulator 130 may determine a slope dV/dt of a gradual change (ramp) in the voltage level of the voltage pulse Vline by adjusting the duration of T4. T3 according to the embodiment of FIG. 10A and T2 according to the embodiment of FIG. 10B are sections in which the voltage level of the voltage pulse Vline gradually rises or falls. The signal modulator may determine the slope dV/dt of each of the T2 and T3 sections by adjusting the duration of T4.

If each of T2 of FIG. 10A and T3 of FIG. 10B in which the voltage level of the voltage pulse Vline rapidly rises is 0, the slope dV/dt of a section in which the voltage level gradually rises or falls satisfies the following equation.

Slope (dV/dt)=(first voltage level($V1$)-second voltage level ($V2$))/($Tx\_CLK$-$T1$-$T4$)  (3).

When the signal modulator 130 increases an absolute value of the slope dTV/dt of the section in which the voltage level of the voltage pulse Vline gradually rises or falls, the voltage pulse Vline generates an area S2 smaller than an area S1 generated during one cycle when the slope is small. The signal modulator 130 can control the power consumed in digital communication by adjusting the value of the slope.

On the other hand, when the value of the slope dV/dt is excessively large, the digital receiving module 200 may recognize the section in which the voltage level of the voltage pulse Vline gradually rises as an inpulse component. Therefore, an appropriate value of T4 may be determined.

Until now, the method by which the signal modulator 130 controls the encoding form of the voltage pulse by adjusting the duration of T1 through T4 constituting a clock cycle Tx_CLK has been described. The method by which the signal modulator 130 adjusts the form and slope of the voltage pulse is not limited to the above embodiment. Various methods of determining the time of change in the voltage level of the voltage pulse Vline and the slope of the voltage pulse Vline can be suggested as embodiments of the present disclosure.

Figure 25B:
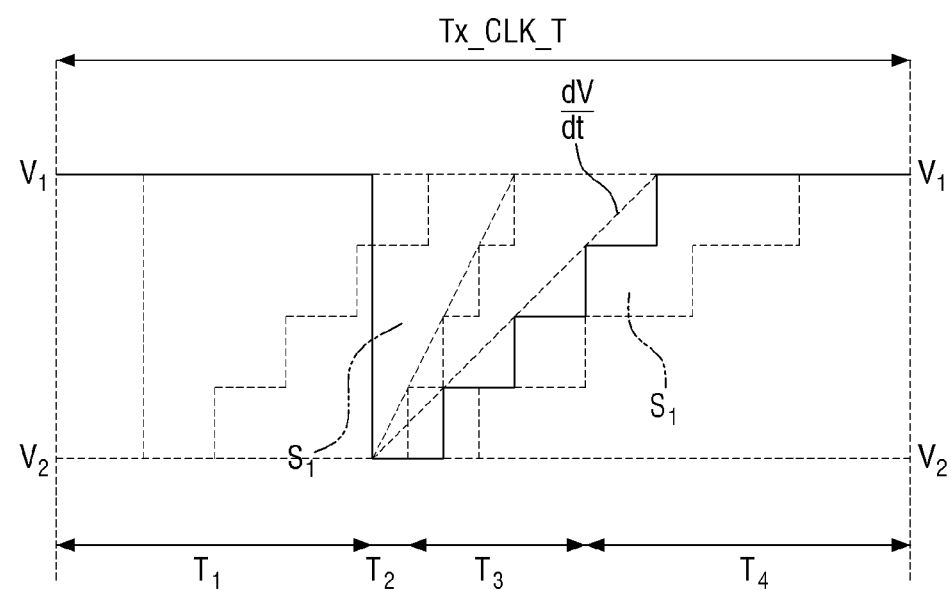
FIG. 25B is another timing diagram for explaining a method by which the signal modulator controls the encoding form of a voltage pulse.

FIG. 25B is another timing diagram for explaining a method by which the signal modulator 130 controls the encoding form of a voltage pulse Vline.

A method of controlling the form of a voltage pulse Vline when the voltage level of the voltage pulse Vline changes in the form of a step function according to the embodiment of FIG. 13 will be described with reference to FIG. 25B. A voltage pulse Vline illustrated in FIG. 25B is different from the voltage pulse Vline illustrated in FIG. 25A in that a gradual change in the voltage level of the voltage pulse Vline is in the form of a step function.

The signal modulator 130 may also control the form of the voltage pulse Vline by adjusting the duration of T1 through T4 when the voltage level of the voltage pulse Vline changes in the form of a step function. The method by which the signal modulator 130 adjusts the form of the voltage pulse Vline in the current embodiment is the same as the method described above with reference to FIG. 25A, and thus its description is omitted.

Figure 25C:
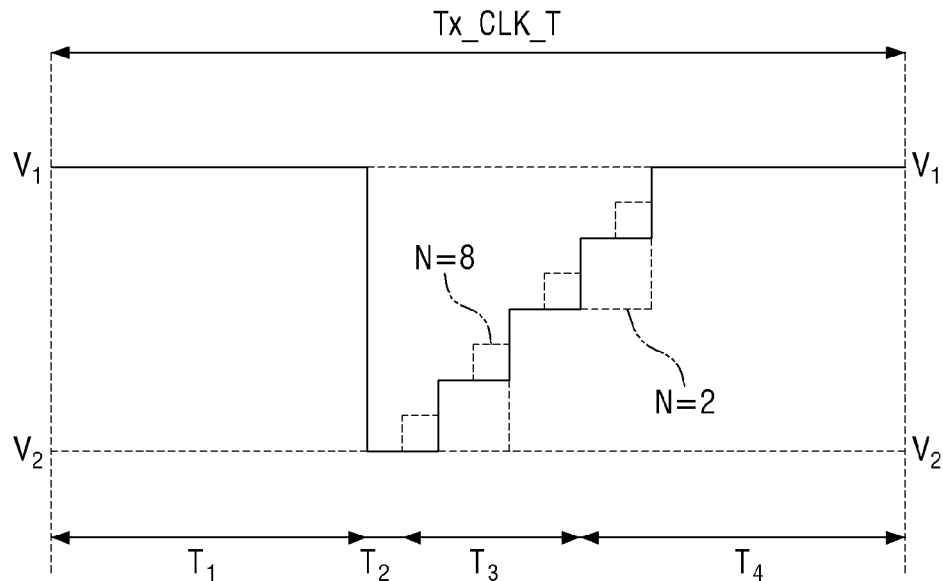
FIG. 25C is another timing diagram for explaining a method by which the signal modulator controls the encoding form of a voltage pulse.

FIG. 25C is another timing diagram for explaining a method by which the signal modulator 130 controls the encoding form of a voltage pulse Vline.

A method by which the signal modulator 130 determines the number N of steps of a step function of a voltage pulse Vline will be described with reference to FIG. 25C. When the voltage pulse Vline is given in the form of a step function, the signal modulator 130 may set the number N of steps of the step function. The signal modulator 130 may encode the set N value into Tx_Control and transmit Tx_Control to the voltage encoder 120. The voltage encoder may configure a circuit by referring to Tx_Control.

In FIG. 25C, cases where the N value is 2 and 8 are indicated by dotted lines. When the number N of steps of the step function increases, changes in the voltage level of the voltage pulse Vline due to the step function are in the form of a gradual curve (ramp). When the difference between voltage levels of adjacent step functions is smaller, the digital receiving module 200 may extract inpulse components with smaller values from the step function, thereby reducing the error rate in digital communication.

On the other hand, when the number N of steps of the step function decreases, the voltage levels of inpulse components extracted by the digital receiving module 200 may have larger values. This may increase the error rate, but simplify the circuit configuration of the digital transmitting module 100 and bring an advantage in terms of bandwidth.

Figure 26:
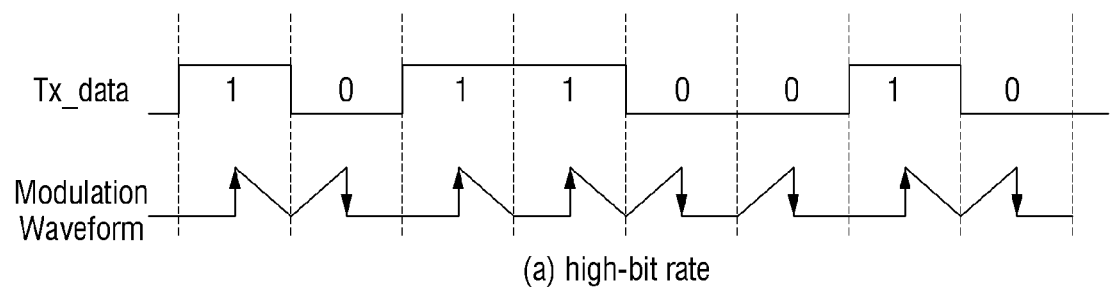
FIG. 26 is a timing diagram for explaining a method by which the signal modulator controls the encoding form of a voltage pulse according to the bit rate of transmission digital data according to some embodiments of the present disclosure.
Figure 26:
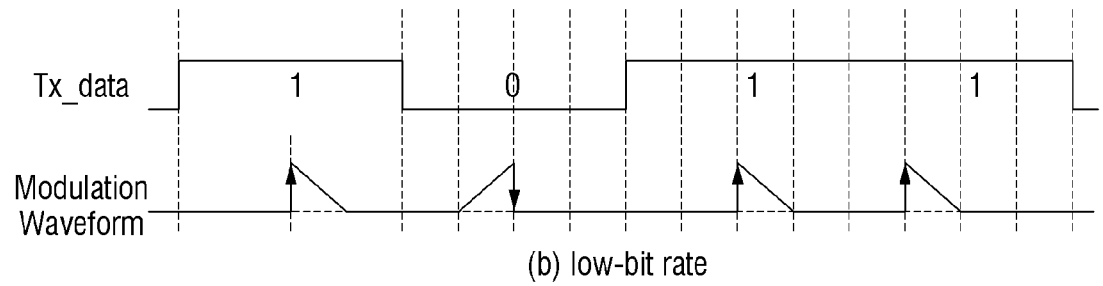

FIG. 26 is a timing diagram for explaining a method by which the signal modulator 130 controls the encoding form of a voltage pulse Vline according to the bit rate of a host clock Tx_CLK according to some embodiments of the present disclosure.

The methods of generating a voltage pulse Vline in various forms according to the circuit configuration of the signal modulator 130 have been described with reference to FIGS. 25A through 25C. In some embodiments of the present disclosure, the signal modulator 130 may be, but is not limited to, an element that generates the voltage pulse Vline in a fixed form according to the circuit performance. The signal modulator 130 may control the form of the voltage pulse Vline in real time. The signal modulator 130 may control the form of the voltage pulse Vline in real time according to the bit rate of transmission digital data Tx_data.

When a clock frequency increases in a digital communication system, more information can be transmitted for the same period of time. However, the error rate increases because the voltage level of a signal changes more frequently. To overcome this problem, the signal modulator 130 may perform the above-described methods of controlling the voltage pulse Vline by referring to a clock bit rate.

A method by which the signal modulator 130 controls the form of the voltage pulse Vline according to the bit rate will be described with reference to FIG. 26. Referring to a timing diagram shown at the top of the drawing, it can be seen that the bit rate is higher than that in a timing diagram shown at the bottom.

When the bit rate of a clock signal is high, the duration of one cycle is short. Therefore, the signal modulator 130 may reduce a period of time during which the voltage pulse Vline is maintained at the first voltage level V1 by adjusting the lengths of T1 through T4.

On the other hand, when the bit rate of the clock signal is low as in the timing diagram shown at the bottom, the duration of one cycle is relatively long. Therefore, there is no problem even if the period of time during which the first voltage level V1 is maintained becomes relatively long, and the signal error rate can be reduced.

In addition, when the voltage pulse is provided in the form of a step function, the signal modulator 130 may determine the number N of steps of the step function according to the bit rate of the transmission digital data Tx_data. When the N value increases, the digital system should control more types of voltage levels during one cycle. This imposes a burden on circuit configuration and increases the error rate. Therefore, the signal modulator may set the N value smaller as the bit rate of the transmission digital data Tx_data increases. On the other hand, when the bit rate is small, the signal modulator may set the N value large to reduce the error rate.

The method by which the signal modulator 130 controls the form of the voltage pulse Vline according to the bit rate of the transmission digital data Tx_data is not limited to the above description. Even when the value of the bit rate increases, the period of time during which the voltage level is maintained at the first voltage level V1 may be increased for various reasons in system configuration, and the number N of steps of the step function may be set to a large value. The same is true when the value of the bit rate decreases.

Figure 27:
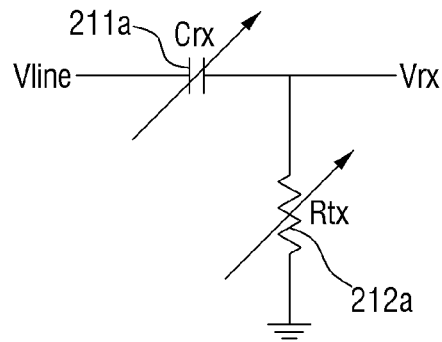
FIG. 27 is a circuit diagram illustrating elements of the inpulse extractor which senses a change in the form of a voltage pulse made by the signal modulator.

FIG. 27 is a circuit diagram illustrating elements of the inpulse extractor 210 which senses a change in the form of a voltage pulse Vline made by the signal modulator 130.

When the signal modulator 130 changes the form of a voltage pulse Vline, the inpulse extractor 210 for detecting inpulse components Vrx may variably extract an inpulse component in response to the change. The inpulse extractor 210 may include a variable resistor Rrx (211a) and a variable condenser Crx (212b) to variably extract an inpulse component signal Vrx.

A cut-off frequency may be represented by $1/(2\pi sR_{rx}sC_{cx})$ as described above. The inpulse extractor 210 may extract the inpulse component signal Vrx of the voltage pulse Vline changed by the signal modulator 130 by changing the element values of Rrx and Crx in real time.

When the signal modulator 130 sets the number N of steps of a step function, the inpulse extractor 210 may determine the values of Vref1 and Vref2 applied to the voltage comparators 213 and 214 for extracting the inpulse component signal Vrx of the voltage pulse Vline.

The circuit configuration of the input extractor 210 which variably extracts an inpulse signal in response to a change in the form of the voltage pulse Vline made by the signal modulator 130 is not limited to the above example. With the addition of the signal modulator 130 in the present disclosure, it is possible to generate a voltage pulse Vline with reduced error rate or power consumption according to the bit rate of transmission digital data Tx_data and perform digital communication using the voltage pulse Vline.

Figure 28A:
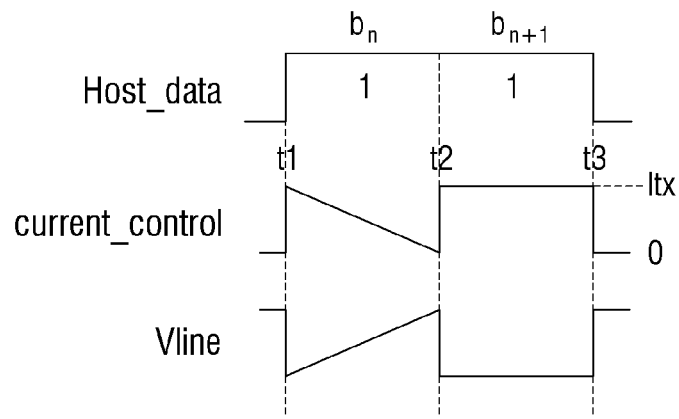
FIG. 28A is a timing diagram for explaining another result of encoding data bits into a voltage pulse using the voltage encoder according to some embodiments of the present disclosure.
Figure 28B:
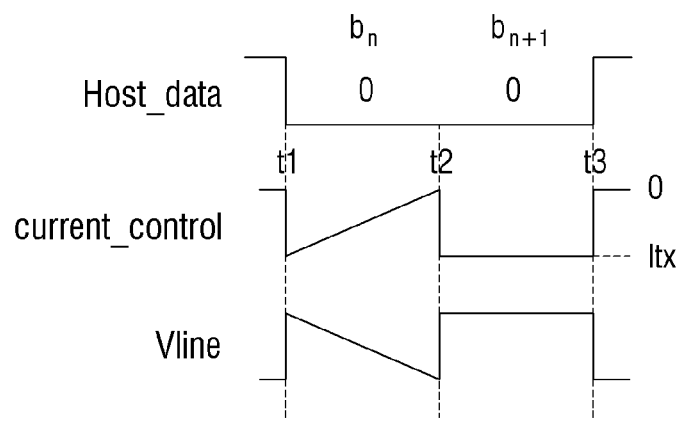
FIG. 28B is another timing diagram for explaining another result of encoding data bits into a voltage pulse using the voltage encoder according to some embodiments of the present disclosure.

FIG. 28A is a timing diagram for explaining another result of encoding data bits into a voltage pulse using the voltage encoder 120 according to some embodiments of the present disclosure. FIG. 28B is a timing diagram for explaining another result of encoding data bits into a voltage pulse using the voltage encoder according to some embodiments of the present disclosure.

Until now, the method by which the voltage encoder 120 encodes digital bits of 0 and 1 into a voltage pulse Vline according to some embodiments and the signal modulator 130 controls the detailed form of the voltage pulse Vline has been described. This method has several problems.

When the signal modulator 130 determines all of T1 and T4 to be 0 and when digital bits are sequentially input like 1→0 or 0→1, a rising edge due to the digital bit 1 and a falling edge due to 0 offset each other. Therefore, an inpulse component for clock synchronization is not detected.

Additionally, when the value of T2+T3 is set to half of the entire cycle as in the above-described embodiment, the following problem occurs. When the bit rate increases, if only half of a given cycle is used, the slope of a gradual change in the voltage level of the voltage pulse Vline is doubled as compared with when the entire cycle is used.

If the slope dV/dt of the voltage pulse Vline is doubled, it is twice as difficult for the inpulse extractor 210 to extract inpulse components Vrx for clock synchronization from the voltage pulse Vline. This ultimately leads to a reduction in the performance of a digital communication system.

To solve the above problem, another method by which the voltage encoder 120 encodes digital bits into a voltage pulse Vline by utilizing the entire cycle Tx_CLK_T of the voltage pulse Vline while including an inpulse component in each cycle is suggested.

A method by which the voltage encoder 120 encodes digital bits into a voltage pulse Vline will be described with reference to FIGS. 28A and 28B. According to the encoding method of FIG. 28A, the voltage encoder 120 may basically set 1 as low and 0 as high based on a voltage pulse Vline. Referring to a (bn+1) bit, it can be seen that encoding has been performed based on the above principle. If 1 is simply encoded as low and 0 as high, no inpulse component is detected when the same bits are successively input as described above.

To solve this problem, when the same bits (bn and bn+1) are successively input, the voltage encoder 120 may express only the voltage level of a voltage pulse Vline of a preceding bit (bn) among the same bits as a falling or rising edge and a gradual rise or fall (ramp).

Referring to FIG. 28A, when 11 is input as digital bits, a voltage pulse Vline corresponding to the preceding bit 1 may gradually rise after a falling edge. Referring to FIG. 28B, when 00 is input as digital bits, a voltage pulse Vline corresponding to the preceding bit 0 may gradually fall after a rising edge. The following bit may be encoded as low or high using a conventional encoding method.

If the above encoding method is used, the voltage pulse Vline can include an inpulse component Vrx in each cycle while utilizing the entire cycle of a digital bit. Since the voltage pulse Vline utilizes the entire cycle, the inpulse extractor 210 can better detect an inpulse component Vrx as compared with the above-described embodiment.

Figure 29:
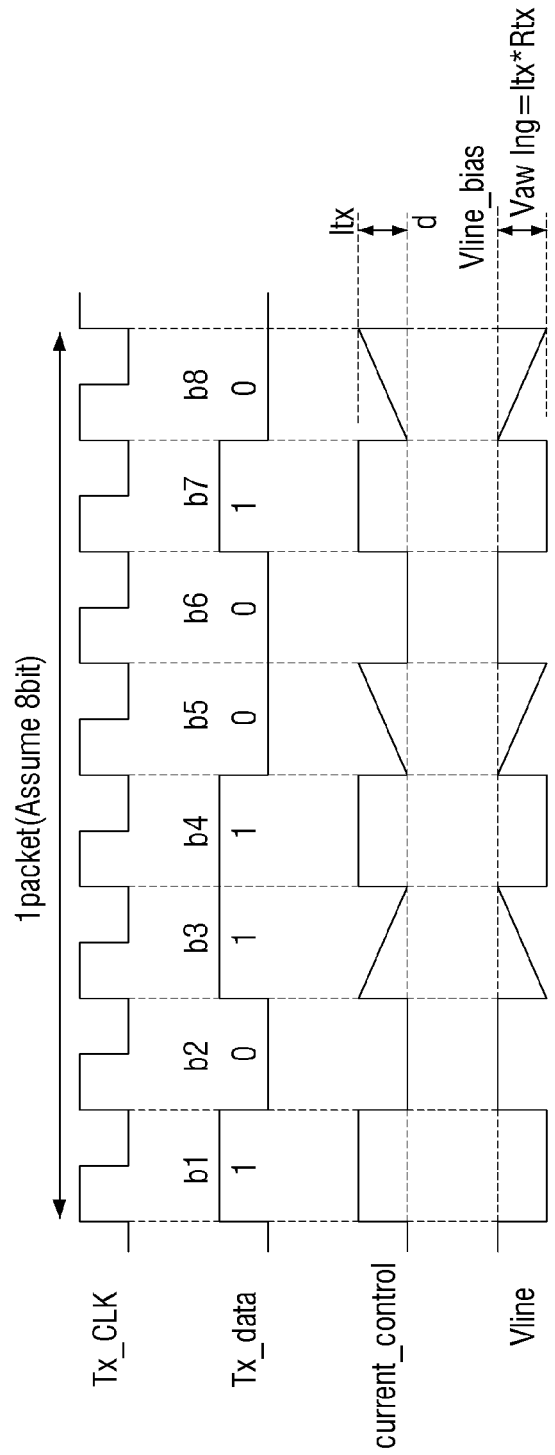
FIG. 29 is a timing diagram for explaining the result of encoding data bits into a voltage pulse using the voltage encoder according to the method of FIGS. 28A and 28B.

FIG. 29 is a timing diagram for explaining the result of encoding data bits into a voltage pulse Vline using the voltage encoder 120 according to the method of FIGS. 28A and 28B.

The encoding form of a voltage pulse Vline according to FIGS. 28A and 28B when digital bits of "10110010" are input will be described with reference to FIG. 29. Referring to the timing diagram, it can be seen that voltage pulses corresponding to b1, b2, b4 and b7 have been encoded in the same form as that in the conventional method.

However, referring to b3 and b4 as well as b5 and b6, bits of 11 and 00 are sequentially input, respectively. In this case, it can be seen that a voltage pulse Vline corresponding to a preceding bit among the successive bits has been encoded according to the above-described embodiment.

Figure 30:
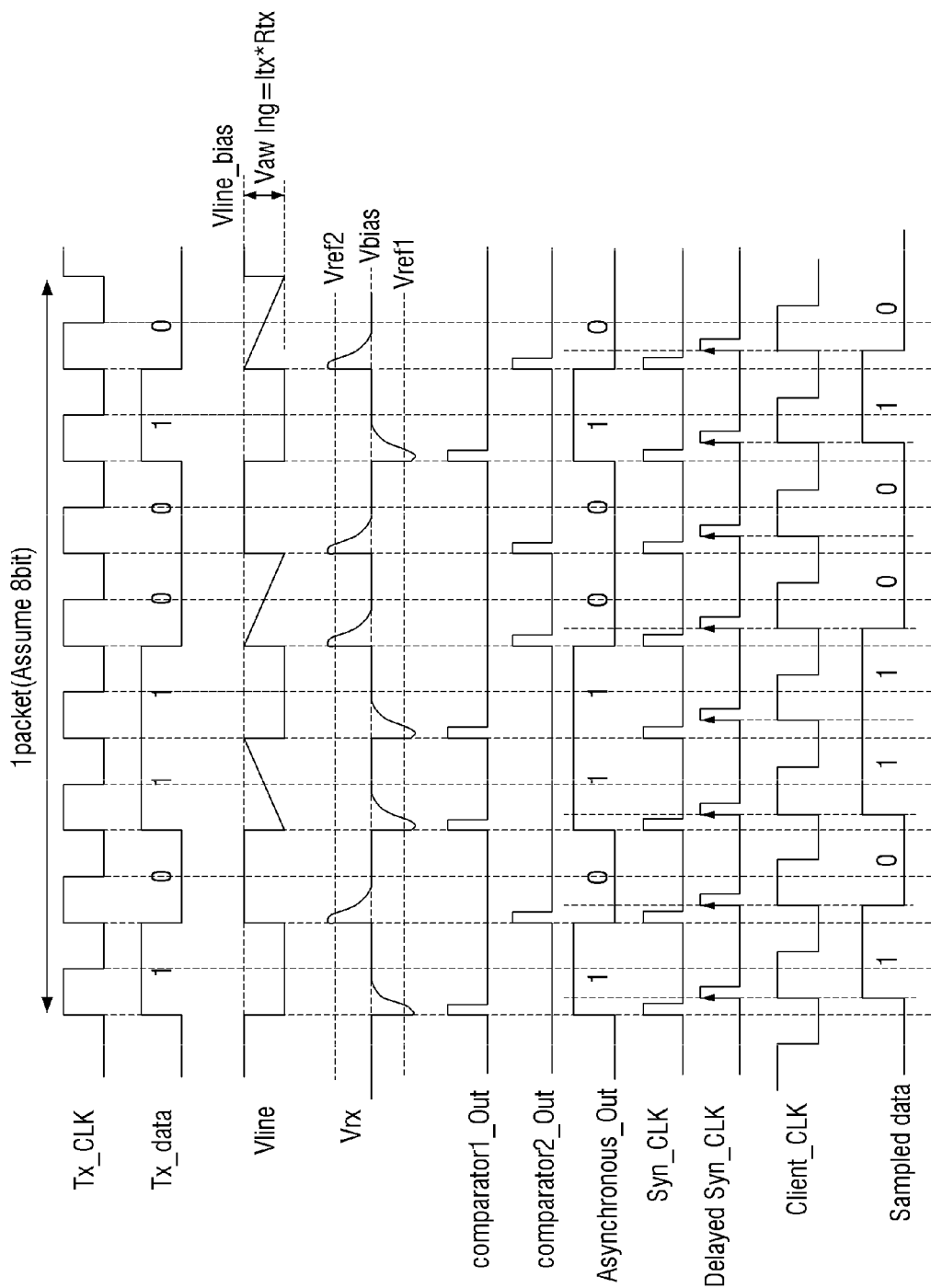
FIG. 30 is a timing diagram for explaining another method by which the digital transmitting module and the digital receiving module perform asynchronous serial communication according to some other embodiments of the present disclosure.

FIG. 30 is a timing diagram for explaining another method by which the digital transmitting module 100 and the digital receiving module 200 perform asynchronous serial communication according to some other embodiments of the present disclosure.

Another embodiment in which the digital transmitting module 100 and the digital receiving module 200 perform asynchronous serial communication at the transmitting end Tx and the receiving end Rx will be described in detail with reference to FIG. 30. The timing diagram of FIG. 30 is different from the timing diagram of FIG. 24 in that the encoding form of a voltage pulse Vline is implemented according to the embodiment suggested in FIGS. 28A and 28B.

It can be seen that a time reference for all signal components including an inpulse component Vrx has shifted forward by half a cycle because the inpulse component Vrx appears at the beginning of a cycle. According to the current embodiment, the same form of digital signal can be transmitted using the entire cycle of the voltage pulse Vline as described above.

The digital bit encoding method according to the embodiment of FIGS. 28A and 28B is not limited to the above example. The correspondence of 1 and 0 can be reversed, and the correspondence between voltage pulses and 11 and 00 can also be reversed according to the correspondence between 1 and 0 and high and low.

In addition, the voltage encoder 120 can implement a section, in which the voltage level of the voltage pulse Vline gradually changes (ramp), in the form of a step function as described above within the scope of the present disclosure.

Figure 31:
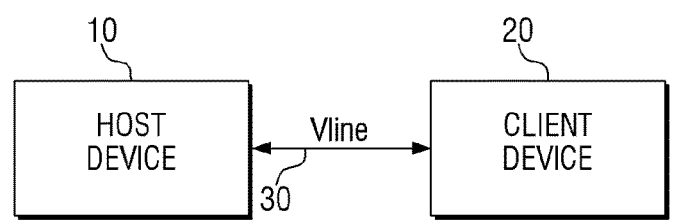
FIG. 31 is a schematic diagram of a half-duplex communication system of a host device and a client device using a digital transmitting module according to an embodiment of the present disclosure and a digital receiving module according to another embodiment.

FIG. 31 is a schematic diagram of a half-duplex communication system of a host device 10 and a client device 20 using a digital transmitting module 100 according to an embodiment of the present disclosure and a digital receiving module 200 according to another embodiment.

In a digital communication system, data is transmitted from the transmitting end Tx to the receiving end Rx. However, devices corresponding to the transmitting end Tr and the receiving end Rx in a general digital communication system do not always operate as the transmitting end Tx or the receiving end Rx.

Since the host device 10 often transmits data to the client device 20 in a digital communication system, the case where the host device 10 is the transmitting end Tx and the client device 20 is the receiving end Rx has been described earlier as an example.

In a recent digital communication system, the client device 20 often needs to transmit data to the host device 10. This is mainly implemented using a half-duplex communication method in asynchronous serial communication.

In the half-duplex method, bidirectional transmission is possible between the host device 10 and the client device 20. However, data is transmitted only to one side at the same time. Specifically, when the host device 10 operates in a transmitting mode, the client device 20 operates in a receiving mode. When the host device 10 operates in the receiving mode, the client device 20 operates in the transmitting mode. In the half-duplex communication method, the bandwidth of data transmission is low because signals cannot be transmitted and received at the same time, but bidirectional communication is possible only with a single transmission line. The half-duplex communication method is mainly used in computer channels.

Referring to FIG. 31, in the digital communication system according to the embodiment of the present disclosure, the host device 10 and the client device 20 may perform half-duplex bidirectional communication.

Figure 32:
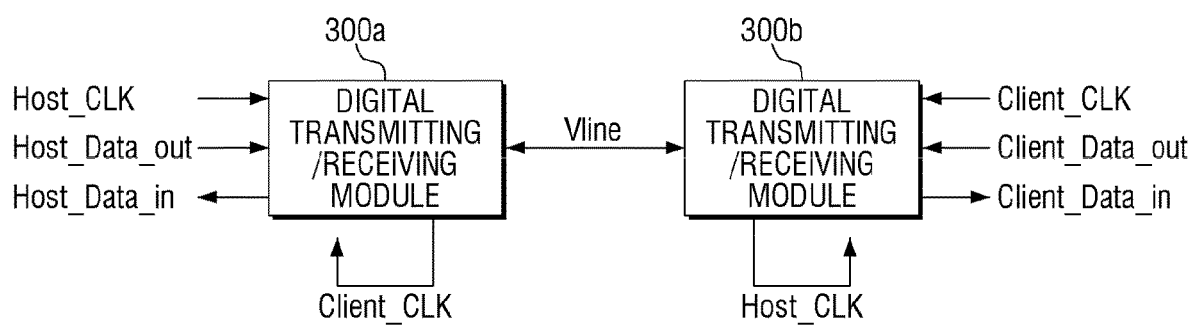
FIG. 32 is a schematic diagram of a half-duplex digital communication system between digital transmitting/receiving modules according to an embodiment of the present disclosure.

FIG. 32 is a schematic diagram of a half-duplex digital communication system between digital transmitting/receiving modules according to an embodiment of the present disclosure.

To implement a half-duplex digital communication system between the host device 10 and the client device 20, digital transmitting/receiving modules 300a and 300b according to an embodiment of the present disclosure are provided. The digital transmitting/receiving modules 300 may be included in the host device 10 and the client device 20. In the half-duplex communication system, it is important to design a polling signal for instructing the host device 10 and the client device 20 to change their communication modes. A method of transmitting the polling signal can utilize a conventional technique, and thus its description is omitted here.

A digital transmitting/receiving module 300a may be included in the host device 10, and another digital transmitting/receiving module 300b may be included in the client device 20. The digital transmitting/receiving module 300a included in the host device 10 and the transmitting/receiving module 300b included in the client device 10 may perform half-duplex digital communication using a voltage pulse applied to a single power line. For ease of description, the digital transmitting/receiving module included in the host device 10 is defined as a host transmitting/receiving module 300a, and the digital transmitting/receiving module included in the client device is defined as a client transmitting/receiving module 300b.

The operation of the host transmitting/receiving module 300a when the host device 10 operates as the transmitting end Tx will be described. The host transmitting/receiving module 300a may receive host digital data from a data output terminal Host_Data_out of the host device 10. The host transmitting/receiving module 300a may receive a host clock signal Host_CLK used in digital communication from the host device 10. The host transmitting/receiving module 300a may encode a voltage pulse Vline to be transmitted to the client device 20 by referring to the host clock signal Host_CLK. The host transmitting/receiving module 300a performs digital communication by transmitting the voltage pulse Vline to the client transmitting/receiving module 300b.

The operation of the host transmitting/receiving module 300a when the host device 10 operates as the receiving end Rx will be described. The host transmitting/receiving module 300a receives a voltage pulse Vline encoded by the client transmitting/receiving module. The host transmitting/receiving module 300a may generate a synchronization signal Client_CLK_syn of a client clock by referring to the voltage pulse Vline. The host transmitting/receiving module 300a may restore a synchronized client clock signal Client_CLK by referring to the synchronization signal of the clock. The host transmitting/receiving module 300a samples decoded client digital data Client_Data_out by referring to the client clock signal Client_CLK and provides the sampled data to a digital input terminal Host_Data_in of the host device 10.

The operation of the client transmitting/receiving module 300b is the same as that of the host transmitting/receiving module 300a except that the digital transmitting/receiving module 300 is included in the client device 20, and thus its description is omitted.

The host device 10 and the client device 20 including the digital transmitting/receiving modules 300 can perform half-duplex digital communication with each other regardless of whether they are the transmitting end Tx or the receiving end Rx.

Figure 33:
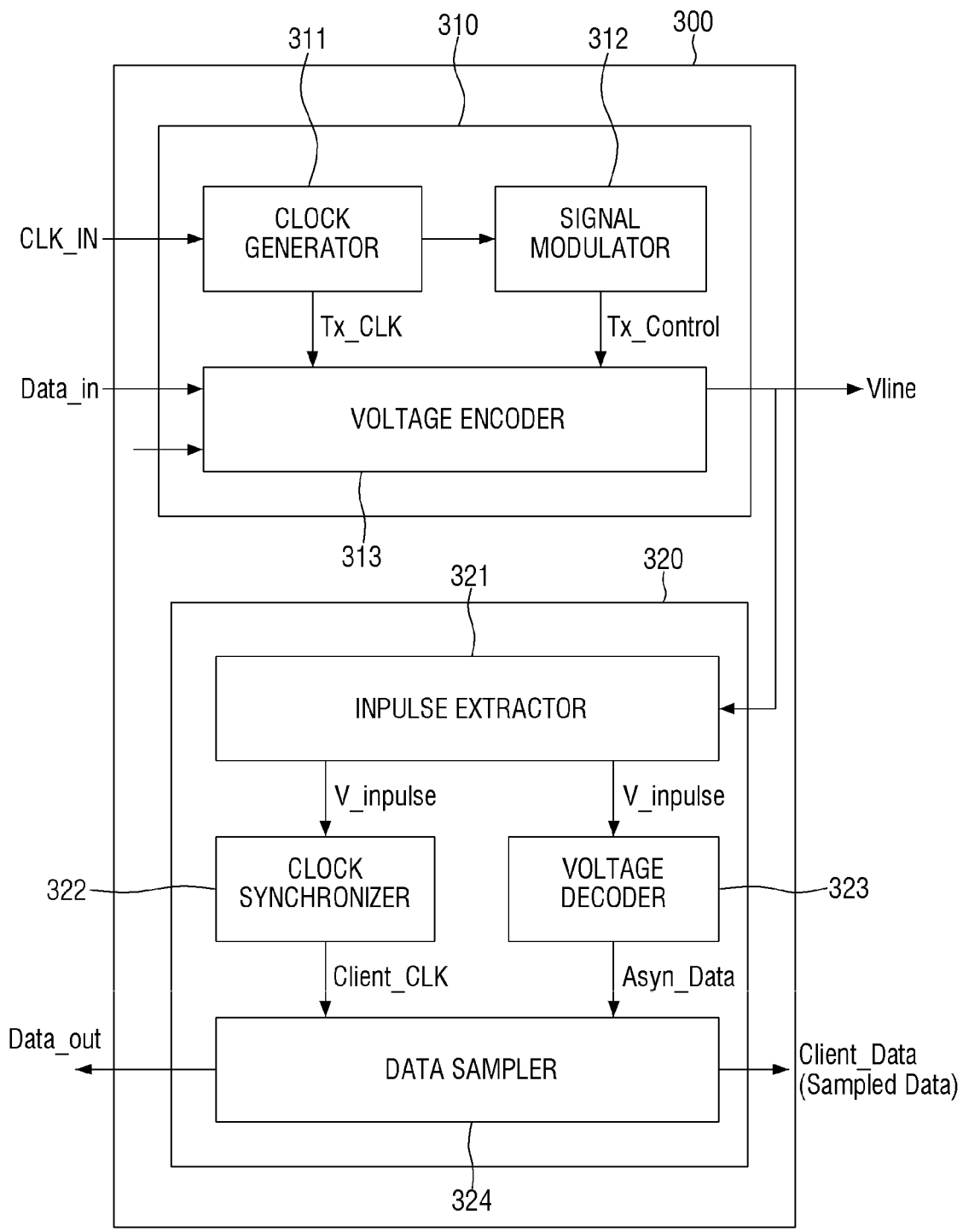
FIG. 33 is a block diagram of a digital transmitting/receiving module according to an embodiment of the present disclosure.

FIG. 33 is a block diagram of a digital transmitting/receiving module 300 according to an embodiment of the present disclosure.

The digital transmitting/receiving module 300 may be included in the host device 10 or the client device 20 to provide a half-duplex digital communication environment between the host device 10 and the client device 20. For digital communication, the digital transmitting/receiving module 300 may include a transmitting end 310, a receiving end 320, and a polling signal generating end (not illustrated).

The transmitting end 310 may receive transmission data Tx_data and a clock signal Tx_CLK and encode a voltage pulse Vline. The transmitting end 310 transmits the voltage pulse Vline to another digital transmitting/receiving module. The transmitting end 310 may include a clock generator 311, a signal modulator 312, and a voltage encoder 313. The operation of each element of the transmitting end 310 is the same as that of each element of the digital transmitting module 100, and thus its description is omitted.

The receiving end 320 receives a voltage pulse Vline from another digital transmitting/receiving module and decodes reception data Data_out. The receiving end 320 may restore a clock signal Rx_data of another transmitting source by referring to the voltage pulse Vline. The receiving end 320 may include an inpulse extractor 321, a clock synchronizer 322, a voltage decoder 323, and a data sampler 324. The operation of each element of the receiving end 320 is the same as that of each element of the digital receiving module 200, and thus its description is omitted.

The polling signal generating end (not illustrated) generates a signal indicating a change of the transmission/reception mode of the digital transmitting/receiving module 300 in a half-duplex digital communication system. The polling signal may be the result of encoding specific digital data into a voltage pulse Vline.

The invention claimed is:

1. A digital transmitting module included in a host device connectable to a client device, the digital transmitting module comprising:
a clock generator which provides the host device with a clock whose one cycle is comprised of T1, T2, T3 and T4 connected sequentially; and
a voltage encoder which receives the clock from the clock generator, receives a digital bit from the host device, generates a voltage pulse by encoding the digital bit based on the clock, and then transmits the voltage pulse to the client device,
wherein the voltage encoder reduces a voltage level of the voltage pulse from a first voltage level to a second voltage level in an inpulse form during T2 of a clock corresponding to the digital bit, gradually increases the voltage level of the voltage pulse from the second voltage level to the first voltage level during T3 of the clock corresponding to the digital bit and maintains the voltage level of the voltage pulse at the second voltage level during a clock corresponding to a next digital bit when the digital bit is 1 and the next digital bit is 1 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 0 and the next digital bit is 0 or reduces the voltage level of the voltage pulse from the first voltage level to the second voltage level in the inpulse form during T2 of the clock corresponding to the digital bit, gradually increases the voltage level of the voltage pulse from the second voltage level to the first voltage level during T3 of the clock corresponding to the digital bit and maintains the voltage level of the voltage pulse at the second voltage level during the clock corresponding to the next digital bit when the digital bit is 0 and the next digital bit is 0 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 1 and the next digital bit is 1.

2. A digital transmitting module included in a host device connectable to a client device, the digital transmitting module comprising:
 a clock generator which provides the host device with a clock whose one cycle is comprised of T1, T2, T3 and T4 connected sequentially; and
 a voltage encoder which receives the clock from the clock generator, receives a digital bit from the host device, generates a voltage pulse by encoding the digital bit based on the clock, and then transmits the voltage pulse to the client device,
 wherein the voltage encoder reduces a voltage level of the voltage pulse from a first voltage level to a second voltage level in an inpulse form during T2 of a clock corresponding to the digital bit, increases the voltage level of the voltage pulse from the second voltage level to the first voltage level in the form of a step having N steps during T3 of the clock corresponding to the digital bit and maintains the voltage level of the voltage pulse at the second voltage level during a clock corresponding to a next digital bit when the digital bit is 1 and the next digital bit is 1 and increases the voltage level of the voltage pulse from the second voltage level to the first voltage level in the inpulse form during T2 of the clock corresponding to the digital bit, reduces the voltage level of the voltage pulse from the first voltage level to the second voltage level in the form of the step function having the N steps during T3 of the clock and maintains the voltage level of the voltage pulse at the first voltage level during the clock corresponding to the next digital bit when the digital bit is 0 and the next digital bit is 0 or reduces the voltage level of the voltage pulse from the first voltage level to the second voltage level in the inpulse form during T2 of the clock corresponding to the digital bit, increases the voltage level of the voltage pulse from the second voltage level to the first voltage level in the form of the step function having the N steps during T3 of the clock corresponding to the digital bit and maintains the voltage level of the voltage pulse at the second voltage level during the clock corresponding to the next digital bit when the digital bit is 0 and the next digital bit is 0 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 1 and the next digital bit is 1.

3. A digital transmitting/receiving module included in a half-duplex digital communication device, the digital transmitting/receiving module comprising:
 a transmitting end which generates a voltage pulse by encoding a digital bit and transmits the voltage pulse to another half-duplex digital communication device when the half-duplex digital communication device operates in a transmitting mode; and
 a receiving end which decodes a digital bit by receiving a voltage pulse from the another half-duplex digital communication device, provides the decoded digital bit to the half-duplex digital communication device and performs clock synchronization when the half-duplex digital communication device operates in a receiving mode,
 wherein the transmitting end comprises a clock generator which provides the half-duplex digital communication device with a clock whose one cycle is comprised of T1, T2, T3 and T4 connected sequentially and a voltage encoder which receives the clock from the clock generator, receives a digital bit from the host device, generates a voltage pulse by encoding the digital bit based on the clock and then transmits the voltage pulse to the another half-duplex digital communication device, and the receiving end comprises an inpulse extractor which receives a voltage pulse from the another half-duplex digital communication device through a single power line and generates an inpulse signal by referring to an inpulse component of the voltage pulse, a voltage decoder which decodes a digital bit by referring to the inpulse signal and a clock synchronizer which generates a clock synchronized with a clock of the another half-duplex digital communication device by referring to the inpulse component existing in each cycle of the inpulse signal, wherein the voltage encoder reduces a voltage level of the voltage pulse from a first voltage level to a second voltage level in an inpulse form during T2 of a clock corresponding to the digital bit, gradually increases the voltage level of the voltage pulse from the second voltage level to the first voltage level during T3 of the clock corresponding to the digital bit and maintains the voltage level of the voltage pulse at the second voltage level during a clock corresponding to a next digital bit when the digital bit is 1 and the next digital bit is 1 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 0 and the next digital bit is 0 or reduces the voltage level of the voltage pulse from the first voltage level to the second voltage level in the inpulse form during T2 of the clock corresponding to the digital bit, gradually increases the voltage level of the voltage pulse from the second voltage level to the first voltage level during T3 of the clock corresponding to the digital bit and maintains the voltage level of the voltage pulse at the second voltage level during the clock corresponding to the next digital bit when the digital bit is 0 and the next digital bit is 0 and increases the voltage level of the voltage pulse from the second voltage level to the first voltage level in the inpulse form during T2 of the clock corresponding to the digital bit, gradually reduces the voltage level of the voltage pulse from the first voltage level to the second voltage level during T3 of the clock and maintains the voltage level of the voltage pulse at the first voltage level during the clock corresponding to the next digital bit when the digital bit is 1 and the next digital bit is 1.

* * * * *